United States Patent
Patterson et al.

(10) Patent No.: US 9,996,953 B2
(45) Date of Patent: Jun. 12, 2018

(54) THREE-DIMENSIONAL ANNOTATION FACING

(71) Applicant: Microsoft Technology Licensing, LLC, Redmond, WA (US)

(72) Inventors: Eric W. Patterson, Sammamish, WA (US); Alexandre da Veiga, Bellevue, WA (US); Ian Patterson Wood, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 13/765,695

(22) Filed: Feb. 13, 2013

(65) Prior Publication Data
US 2014/0047313 A1 Feb. 13, 2014

Related U.S. Application Data

(60) Provisional application No. 61/681,851, filed on Aug. 10, 2012.

(51) Int. Cl.
*G06F 17/00* (2006.01)
*G06T 11/20* (2006.01)
(Continued)

(52) U.S. Cl.
CPC .............. *G06T 11/206* (2013.01); *G06F 3/01* (2013.01); *G06F 3/048* (2013.01); *G06F 3/0481* (2013.01);
(Continued)

(58) Field of Classification Search
CPC .................................................. G06F 17/241
See application file for complete search history.

(56) References Cited

U.S. PATENT DOCUMENTS 4,041,467 A 8/1977 Cota et al.
5,526,478 A * 6/1996 Russell et al. ................ 715/202
(Continued)

FOREIGN PATENT DOCUMENTS

CN 1808376 7/2006
CN 101014831 8/2007
(Continued)

OTHER PUBLICATIONS

International Search Report dated Nov. 28, 2013 in International Application No. PCT/US13/054038.
(Continued)

*Primary Examiner* — Scott Baderman
*Assistant Examiner* — Barbara Level
(74) *Attorney, Agent, or Firm* — Schwegman Lundberg & Woessner, P.A.

(57) ABSTRACT

Concepts and technologies are described herein for providing a three-dimensional ("3D") annotation facing tool. In accordance with some concepts and technologies disclosed herein, the 3D annotation facing tool provides a way for a user to control the orientation of annotations associated with productivity data in a 3D environment. The 3D annotation facing tool can provide a user with the ability to lock the orientation of the annotation along one or more directional axes. The 3D annotation facing tool can also provide a user with the ability to maintain an orientation of the annotation in a camera facing view.

16 Claims, 12 Drawing Sheets

(51) Int. Cl.
  *G06F 3/0484* (2013.01)
  *G06F 3/0482* (2013.01)
  *G06T 15/10* (2011.01)
  *G06T 13/00* (2011.01)
  *G06F 17/30* (2006.01)
  *G06F 17/24* (2006.01)
  *G06F 3/0481* (2013.01)
  *G06F 3/01* (2006.01)
  *G06F 3/0488* (2013.01)
  *G06T 19/00* (2011.01)
  *G06F 3/048* (2013.01)
  *G06T 15/00* (2011.01)

(52) U.S. Cl.
  CPC .......... *G06F 3/0482* (2013.01); *G06F 3/0488* (2013.01); *G06F 3/04815* (2013.01); *G06F 3/04842* (2013.01); *G06F 3/04847* (2013.01); *G06F 17/24* (2013.01); *G06F 17/241* (2013.01); *G06F 17/246* (2013.01); *G06F 17/30056* (2013.01); *G06F 17/30061* (2013.01); *G06F 17/3087* (2013.01); *G06F 17/30241* (2013.01); *G06F 17/30244* (2013.01); *G06F 17/30551* (2013.01); *G06F 17/30554* (2013.01); *G06F 17/30572* (2013.01); *G06F 17/30991* (2013.01); *G06T 13/00* (2013.01); *G06T 15/00* (2013.01); *G06T 15/10* (2013.01); *G06T 19/00* (2013.01)

(56) References Cited

U.S. PATENT DOCUMENTS

| | | | |
|---|---|---|---|
| 5,960,437 A | 9/1999 | Krawchuk et al. | |
| 5,977,978 A | 11/1999 | Carey et al. | |
| 6,256,649 B1 | 7/2001 | Mackinlay et al. | |
| 6,256,651 B1 | 7/2001 | Tuli | |
| 6,360,332 B1 | 3/2002 | Weinberg et al. | |
| 6,501,469 B1 | 12/2002 | Macphail | |
| 6,587,969 B1 | 7/2003 | Weinberg et al. | |
| 6,707,454 B1 | 3/2004 | Barg et al. | |
| 6,904,392 B1* | 6/2005 | Marty et al. | 703/1 |
| 6,990,637 B2 | 1/2006 | Anthony et al. | |
| 6,995,768 B2 | 2/2006 | Jou et al. | |
| 7,010,616 B2 | 3/2006 | Carlson et al. | |
| 7,015,183 B2 | 3/2006 | Baik et al. | |
| 7,039,240 B2 | 5/2006 | Greene et al. | |
| 7,039,899 B1 | 5/2006 | Quiroga | |
| 7,057,612 B2 | 6/2006 | Balfour | |
| 7,093,240 B1 | 8/2006 | Rodi et al. | |
| 7,127,672 B1 | 10/2006 | Patterson et al. | |
| 7,225,189 B1 | 5/2007 | McCormack et al. | |
| 7,264,554 B2 | 9/2007 | Bentley | |
| 7,265,554 B2 | 9/2007 | Ichimura et al. | |
| 7,289,227 B2 | 10/2007 | Smetak et al. | |
| 7,333,113 B2 | 2/2008 | Gordon | |
| 7,358,972 B2 | 4/2008 | Gordon et al. | |
| 7,370,883 B2 | 5/2008 | Basir et al. | |
| 7,415,481 B2 | 8/2008 | Becker et al. | |
| 7,474,256 B2 | 1/2009 | Ohta et al. | |
| 7,475,344 B1 | 1/2009 | Patil et al. | |
| 7,571,151 B1 | 8/2009 | Fontaine | |
| 7,573,480 B2 | 8/2009 | Gordon | |
| 7,688,998 B2 | 3/2010 | Tuma et al. | |
| 7,696,876 B2 | 4/2010 | Dimmer et al. | |
| 7,737,979 B2 | 6/2010 | Robertson et al. | |
| 7,746,343 B1 | 6/2010 | Charaniya et al. | |
| 7,810,021 B2 | 10/2010 | Paxson | |
| 7,812,842 B2 | 10/2010 | Gordon | |
| 7,840,031 B2 | 11/2010 | Albertson et al. | |
| 7,857,212 B1 | 12/2010 | Matthews | |
| 7,869,938 B2 | 1/2011 | Wako | |
| 7,870,496 B1 | 1/2011 | Sherwani | |
| 7,925,982 B2 | 4/2011 | Parker et al. | |
| 8,015,183 B2 | 9/2011 | Frank | |
| 8,024,656 B2 | 9/2011 | Behnen et al. | |
| 8,095,434 B1 | 1/2012 | Puttick et al. | |
| 8,224,304 B2 | 7/2012 | Gatti et al. | |
| 8,319,772 B2 | 11/2012 | Fong et al. | |
| 8,368,722 B1 | 2/2013 | Moore | |
| 8,397,177 B2 | 3/2013 | Barros | |
| 8,584,013 B1 | 11/2013 | Tveit | |
| 8,601,402 B1 | 12/2013 | Habboub | |
| 8,793,575 B1* | 7/2014 | Lattyak | G09B 5/062 715/273 |
| 8,812,947 B1 | 8/2014 | Maoz et al. | |
| 8,884,964 B2* | 11/2014 | Holl et al. | 345/440 |
| 8,892,123 B2 | 11/2014 | Krantz et al. | |
| 8,924,843 B1 | 12/2014 | Hao et al. | |
| 8,947,435 B2 | 2/2015 | Kim et al. | |
| 8,966,356 B1* | 2/2015 | Hickman | G06F 17/00 715/205 |
| 8,984,415 B2 | 3/2015 | Rose et al. | |
| 9,007,302 B1 | 4/2015 | Bandt-Horn | |
| 9,015,591 B2 | 4/2015 | Khosravy et al. | |
| 9,141,641 B2 | 9/2015 | Gaertner et al. | |
| 9,317,963 B2 | 4/2016 | Ruble et al. | |
| 9,383,911 B2 | 7/2016 | Aymeloglu et al. | |
| 9,454,281 B2 | 9/2016 | Ward et al. | |
| 9,454,785 B1 | 9/2016 | Hunter et al. | |
| 2002/0161799 A1 | 10/2002 | Maguire, III et al. | |
| 2003/0028848 A1 | 2/2003 | Choi | |
| 2003/0071814 A1 | 4/2003 | Jou et al. | |
| 2004/0126803 A1 | 7/2004 | Cash et al. | |
| 2004/0152056 A1 | 8/2004 | Lamb et al. | |
| 2004/0216033 A1 | 10/2004 | Hallett et al. | |
| 2006/0013487 A1 | 1/2006 | Longe et al. | |
| 2006/0095447 A1 | 5/2006 | Dickinson et al. | |
| 2006/0112123 A1 | 5/2006 | Clark et al. | |
| 2007/0101252 A1 | 5/2007 | Chamberlain et al. | |
| 2007/0132767 A1 | 6/2007 | Wright et al. | |
| 2007/0150553 A1 | 6/2007 | Fields et al. | |
| 2007/0245238 A1 | 10/2007 | Fugitt et al. | |
| 2008/0033641 A1 | 2/2008 | Medalia | |
| 2008/0077597 A1 | 3/2008 | Butler | |
| 2008/0163328 A1 | 7/2008 | Philbin et al. | |
| 2008/0189639 A1 | 8/2008 | Iyer et al. | |
| 2008/0192056 A1 | 8/2008 | Robertson et al. | |
| 2008/0215959 A1 | 9/2008 | Lection | |
| 2008/0270366 A1 | 10/2008 | Frank | |
| 2008/0288889 A1 | 11/2008 | Hunt et al. | |
| 2008/0291206 A1 | 11/2008 | Uchimura et al. | |
| 2008/0294662 A1 | 11/2008 | Chen | |
| 2008/0295038 A1 | 11/2008 | Helfman et al. | |
| 2008/0301112 A1 | 12/2008 | Wu | |
| 2009/0040186 A1 | 2/2009 | Esenther | |
| 2009/0041329 A1 | 2/2009 | Nordell et al. | |
| 2009/0044121 A1 | 2/2009 | Berger et al. | |
| 2009/0096812 A1 | 4/2009 | Boixel et al. | |
| 2009/0128565 A1 | 5/2009 | Wong et al. | |
| 2009/0132952 A1 | 5/2009 | Wong | |
| 2009/0132967 A1 | 5/2009 | Wong et al. | |
| 2009/0153585 A1 | 6/2009 | Mahajan et al. | |
| 2009/0182755 A1 | 7/2009 | Adair et al. | |
| 2009/0217187 A1 | 8/2009 | Kendall et al. | |
| 2009/0229819 A1* | 9/2009 | Repin et al. | 166/250.01 |
| 2009/0234864 A1 | 9/2009 | Exllis et al. | |
| 2009/0276692 A1 | 11/2009 | Rosner | |
| 2009/0307607 A1* | 12/2009 | Schauls | G06F 3/0483 715/752 |
| 2009/0307618 A1* | 12/2009 | Lawler et al. | 715/764 |
| 2009/0319553 A1 | 12/2009 | Le Brazidec et al. | |
| 2010/0054527 A1 | 3/2010 | Kirmse et al. | |
| 2010/0083184 A1 | 4/2010 | Trent et al. | |
| 2010/0088619 A1 | 4/2010 | Rath et al. | |
| 2010/0117622 A1 | 5/2010 | Miller et al. | |
| 2010/0134484 A1* | 6/2010 | Chen et al. | 345/419 |
| 2010/0156889 A1 | 6/2010 | Martinez et al. | |
| 2010/0167256 A1 | 7/2010 | Blash | |
| 2010/0185933 A1* | 7/2010 | Coffman et al. | 715/230 |
| 2010/0185984 A1 | 7/2010 | Wright et al. | |
| 2010/0194778 A1 | 8/2010 | Robertson et al. | |
| 2010/0238182 A1 | 9/2010 | Geisner et al. | |

(56) References Cited

U.S. PATENT DOCUMENTS

| | | | |
|---|---|---|---|
| 2010/0271391 A1* | 10/2010 | Repin et al. | 345/619 |
| 2010/0306128 A1 | 12/2010 | Moffat et al. | |
| 2010/0318512 A1 | 12/2010 | Ludwig | |
| 2010/0325196 A1 | 12/2010 | Beckman et al. | |
| 2011/0066933 A1 | 3/2011 | Ludwig | |
| 2011/0102424 A1 | 5/2011 | Hibbert et al. | |
| 2011/0137766 A1 | 6/2011 | Rasmussen et al. | |
| 2011/0140928 A1 | 6/2011 | Ren et al. | |
| 2011/0166831 A1* | 7/2011 | Snyder et al. | 703/1 |
| 2011/0173193 A1 | 7/2011 | Ahn et al. | |
| 2011/0210983 A1 | 9/2011 | Theimer et al. | |
| 2011/0270705 A1 | 11/2011 | Parker | |
| 2011/0285727 A1 | 11/2011 | Fernandez et al. | |
| 2012/0042282 A1 | 2/2012 | Wong | |
| 2012/0084733 A1 | 4/2012 | Guo et al. | |
| 2012/0110513 A1 | 5/2012 | Gaertner et al. | |
| 2012/0117112 A1 | 5/2012 | Johnston et al. | |
| 2012/0137204 A1 | 5/2012 | Petrovicky et al. | |
| 2012/0144325 A1* | 6/2012 | Mital et al. | 715/763 |
| 2012/0173501 A1 | 7/2012 | Ganesan et al. | |
| 2012/0173985 A1 | 7/2012 | Peppel | |
| 2012/0191786 A1 | 7/2012 | Downing | |
| 2012/0192051 A1 | 7/2012 | Rothschiller et al. | |
| 2012/0218254 A1 | 8/2012 | Abeln | |
| 2012/0236201 A1 | 9/2012 | Larsen et al. | |
| 2012/0284670 A1 | 11/2012 | Kashik et al. | |
| 2013/0139044 A1 | 5/2013 | Iversen | |
| 2013/0179817 A1 | 7/2013 | Bak et al. | |
| 2014/0006966 A1 | 1/2014 | Geralci | |
| 2014/0007017 A1 | 1/2014 | Stemfeld et al. | |
| 2014/0026088 A1 | 1/2014 | Monte | |
| 2014/0028674 A1 | 1/2014 | Eldin | |
| 2014/0043325 A1 | 2/2014 | Ruble et al. | |
| 2014/0043340 A1 | 2/2014 | Sobhy et al. | |
| 2014/0046923 A1 | 2/2014 | Ruble et al. | |
| 2014/0047312 A1 | 2/2014 | Ruble et al. | |
| 2014/0047328 A1 | 2/2014 | Ruble et al. | |
| 2014/0047381 A1 | 2/2014 | Fan et al. | |
| 2014/0047385 A1 | 2/2014 | Ruble et al. | |
| 2014/0182350 A1 | 7/2014 | Bhavaraju et al. | |
| 2014/0380244 A1 | 12/2014 | Tecarro et al. | |
| 2015/0169694 A1 | 6/2015 | Longo et al. | |
| 2015/0172396 A1 | 6/2015 | Longo et al. | |
| 2015/0346992 A1 | 12/2015 | Fan et al. | |
| 2016/0196674 A1 | 7/2016 | Ruble et al. | |

FOREIGN PATENT DOCUMENTS

| | | |
|---|---|---|
| CN | 101166327 | 4/2008 |
| CN | 101187868 | 5/2008 |
| CN | 101390042 | 3/2009 |
| CN | 101401098 | 4/2009 |
| CN | 101877015 | 11/2010 |
| CN | 101918983 | 12/2010 |
| CN | 102474540 | 5/2012 |
| CN | 102609507 | 7/2012 |
| CN | 102629271 | 8/2012 |
| EP | 1736903 | 12/2006 |
| EP | 1840515 | 10/2007 |
| TW | 200847041 | 12/2008 |
| WO | WO 2010/087782 A2 | 8/2010 |

OTHER PUBLICATIONS

International Search Report dated Oct. 24, 2103 in International Application No. PCT/US13/ 054039.
International Search Report dated Nov. 28, 2013 in International Application No. PCT/US13/054235.
International Search Report dated Oct. 14, 2013 in International Application No. PCT/US13/054236.
International Search Report dated Oct. 24, 2013 in International Application No. PCT/US13/054237.
International Search Report dated Nov. 7, 2013 in International Application No. PCT/US13/054238.
International Search Report dated Oct. 15, 2103 in International Application No. PCT/US13/054234.
International Search Report dated Oct. 18, 2013 in International Application No. PCT/US13/054239.
Aliakseyeu et al., "Interaction Techniques for Navigation through and Manipulation of 2D and 3D Data," Published on: May 30, 2002, In *Eigth Eurographics Workshop on Virtual Environments*, 10pp.
Allegra, Christo, "3D Data Visualization / Casey Rees", Winter 2009, Available at: http://plastid.com/files/3Dvisualization.pdf, 6pp.
Aigner et al., "Visual Methods for Analyzing Time-Oriented Data," Jan./Feb. 2008, *IEEE Transactions on Visualization and Computer Graphics*, 14(1): ,47-60.
Ben-Yitzhak et al., "Beyond Basic Faceted Search," Feb. 11, 2008, *Proceedings of the international conference on web search and web data mining '08*, 11 pp.
Chi, Ed Huai-Hsin, "A Framework for Information Visualization Spreadsheets", Published on: Mar. 8, 1999, Doctoral Thesis submitted to the faculty of the graduate school of the University of Minnesota, Available at: http://citeseerx.ist.psu.edu/viewdoc/download?doi=10.1.1.25.5975&rep=rep1&type=pdf, 160pp.
Chi et al., "Principles for Information Visualization Spreadsheets," Published on: Jul. 1998, In *IEEE Computer Graphics and Applications*, 9pp.
Chung et al., "VizCept: Supporting Synchronous Collaboration for Constructing Visualizations in Intelligence Analysis," Oct. 24-29, 2010, IEEE Symposium on Visual Analytics Science and Technology, Salt Lake City, Utah, 8 pp.
Clarke, Keir, "Viewing Large Data Sets with Google Maps," Sep. 9, 2010, Available at: webarchive.org/web/20111017065022/http://googlemapsmania.blogspot.com/2010/09/viewing-large-data-sets-with-google.html, 4 pp.
Clarkson et al., "ResultMaps: Visualization for Search Interfaces", Oct. 11, 2009, *IEEE Transactions on Visualization and Computer, Graphics*, vol. 15, No. 6, 8pp.
Enkhsaikhan et al., "Graphical and Temporal Visualisation of Social Relationships," Jul. 3, 2008, *Proceeding of Pacific Asia Conference on Information Systems*, PACIS '08, Paper 243, 12 pp.
Heer et al., "Animated Transitions in Statistical Data Graphics," Oct. 27, 2007, *IEEE Transactions on Visualization and Computer Graphics*, 13(6):1240-1247.
Jankun-Kelly et al., "A Spreadsheet Interface for Visualization Exploration," Published on: Oct. 13, 2000, In *IEEE Visualization*, 9pp.
Javaid, "Embed Video in Excel 2010", Published on: Mar. 6, 2010, Available at: http://www.addictivetips.com/microsoft-office/embed-video-in-excel-2010/, 6pp.
Lutz et al., "Chartflight—From Spreadsheets to Computer-Animated Data Flights," 2010, *Proceedings of the 15th International Conference on Web 3D Technology*, pp. 127-136.
McDermott, Mat, "Great New Google Earth Layer Maps US Carbon Emission," Published on: Feb. 20, 2009, Available at: http://web.archive.org/web/20120206220208/http://www.treehugger.com/clean-technology/great-new-google-earth-layer-maps-us-carbon-emissions.html, 3 pp.
Pilgrim et al., "Abstract Data Visualisation in the Built Environment", Published on: Jul. 19, 2000, In *IEEE International Conference on Information Visualization*, 9pp.
Rayson, "Aggregate Towers: Scale Sensitive Visualization and Decluttering of Geospatial Data," Published on: Oct. 24, 1999, in *Information Visualization*, 9pp.
Roth et al., "Visage: A User Interface Environment for Exploring Information," Oct. 18, 1996, *IEEE Symposium on Information Visualization*, 8 pp.
Shiozawa et al., "3D Interactive Visualization for Inter-Cell Dependencies of Spreadsheets", Oct. 24, 1999, *IEEE Symposium on Information Visualization*, 4 pp.
Svennerberg, Gabriel, "Handling Large Amounts of Markers in Google Maps," Published on: Jan. 13, 2009, Available at: http://www.svennerberg.com/2009/01/handling-large-amounts-of-markers-in-google-maps/, 7pp.
Webb, Chris, "Self-Service BI Mapping with Microsoft Research's Layerscape-Part1," Published on: Apr. 13, 2012, Available at:

(56) References Cited

OTHER PUBLICATIONS http://cwebbi.wordpress.com/2012/04/13/self-servicde-bi-mapping-with-microsoft-researchs-layerscapepart-1/, 13 pp.
Woodring et al., "Multiscale Time Activity Data Exploration via Temporal Clustering Visualization Spreadsheet," Jan./Feb. 2009, *IEEE Transactions on Visualization and Computer Graphics*, 15(1): 123-137.
Zhang et al., "Beyond Co-occurrence: Discovering and Visualizing Tag Relationships from Geo-spatial and Temporal Similarities," Feb. 8-12, 2012, *Proceedings of the fifth ACM international conference on Web search and data mining*, WSDM '12, Seattle, Washington, 10 pp.
"3D Graphics Animations in Excel," Feb. 23, 2011, Spidgorny, YouTube Video, Available at: http://www.youtube.com/watch?feature=player_embedded&v=7ucoeXEnkHO, 1 p.
"Effective Information Visualization Guidelines and Metrics for 3D Interactive Representations of Business Data", Published on Dec. 7, 2012, Available at: http://www3.sympatico.ca/blevis/thesis49guide.html, 41 pp.
"Improving Data Visualisation for the Public Sector: Case Study: Practical Steps for Improving Visualisation," Oct. 2, 2009, retrieved from http://www.improving-visualisation.org/case-studies/id=7, 11 pp.
"Visualize Field Data in Google Earth and Fusion Tables," Published on: Apr. 29, 2012, Available at: http://web.archive.org/web/20120429055706/http://www.google.com/earth/outreach/tutorials/odk_visualize.html, 4pp.
Andy, "Google Earth—From the 3D City to Data Visualisation", Oct. 7, 2007, Retrieved at «http://www.digitalurban.org/2007/10/google-earth-from-3d-city-to-data.html», Retrieved Date : Dec. 7, 2012, pp. 3.
Woodard, Brad, "Mappable 3D Data Visualizations in Real-Time", Jan. 23, 2012, Retrieved at «http://www.visualnews.com/2012/01/23/mappable-3d-data-visualizations-in-real-time/», Retrieved Date : Dec. 7, 2012, pp. 15.
"Displaying annotation features in ArcGlobe", Retrieved at «http://resources.arcgis.com/en/help/main/10.1/index.html#//00q800000022000000», Retrieved Date : Dec. 7, 2012, pp. 2.
Welcome to the WorldWide Telescope Add-in for Excel, retrieved Dec. 13, 2012 from http://www.layerscape.org/Home/ExcelAddInWelcome, 2 pp.
Wong, Curtis, "Building the WorldWide Telescope," Jun. 2008, SIGMOND Record, 37(2): 67-69.
Wong, Curtis, "Contextual Narrative as an Information Architecture for the WorldWide Telescope," May 2008, CAPjournal, 3: 22-25.
Kanipe, Jeff "The Universe in Your Computer," Jan. 2009, Communication of the ACM, 51(1): 12-14.
U.S. Official Action dated Jun. 6, 2014 in U.S. Appl. No. 13/711,629.
U.S. Official Action dated Dec. 16, 2014 in U.S. Appl. No. 13/856,476.
U.S. Official Action dated Nov. 6, 2014 in U.S. Appl. No. 13/760,032.
"Create a Map / BatchGeo" Published 2010, Available at http://www/batchgeo.com, 7pp.
Darbyshire et al., "Getting Started With Google Apps", Friends of ED, Berkeley CA, 2010, 665 pages.
Office action for U.S. Appl. No. 13/835,721, dated Feb. 26, 2015, Sobhy, et al, "Animation transitions and effects in a spreadsheet application", 37 pages.
Office action for U.S. Appl. No. 13/711,629, dated Feb. 27, 2015, Ruble et al., "Generating Queries Based upon dated points ina spreadsheet application", 43 pages.
Office action for U.S. Appl. No. 13/760,032, dated Apr. 24, 2015, Ruble et al., "3D Data environment disambiguation tool", 27 pages.
Office action for U.S. Appl. No. 13/856,116, dated May 21, 2015, Ruble et al., "Displaying Temporal Information in a Spreadsheet Application", 10 pages.
Office action for U.S. Appl. No. 13/906,343, dated May 26, 2015, Ruble et al., "Facetted Browsing", 14 pages.

Office action for U.S. Appl. No. 13/835,721, dated Jun. 29, 2015, "Animation transitions and effects in a spreadsheet application", 45 pages.
Office action for U.S. Appl. No. 13/906,343, dated Apr. 13, 2016, Ruble et al., "Facetted Browsing", 26 pages.
Office action for U.S. Appl. No. 13/711,629, dated Apr. 6, 2016, Ruble et al., "Generating Queries Based Upon Data Points in a Spreadsheet Application", 34 pages
BatchGeo, "Create Maps", Retrieved from «https://web.archive.org/web.20110305134009/http://www.batchgeo.com/», Mar. 2011, 9 pages.
BatchGeo, "How to edit your map", Retreived from «https://www.youtube.com/watch?v=jaeR8VsEPJo», Mar. 30, 2010, 1 page.
Office action for U.S. Appl. No. 13/898,469, dated Oct. 27, 2015, Ruble et al., "Generating scenes and tours in a spreadsheet application", 7 pages.
Office action for U.S. Appl. No. 13/835,721, dated Oct. 30, 2015, Sobhy et al., "Animation Transitions and Effects in a Spreadsheet Application", 51 pages.
Office action for U.S. Appl. No. 13/856,476 dated Oct. 5, 2015, Fan et al., "3D Data Environment Navigation Tool", 13 pages.
Office action for U.S. Appl. No. 13/906,343, dated Oct. 8, 2015, Ruble et al., "Facetted Browsing", 21 pages.
Office action for U.S. Appl. No. 13/856,116, dated Dec. 21, 2015, Ruble et al., "Displaying Temporal Information in a Spreadsheet Application", 10 pages.
Office action for U.S. Appl. No. 13/760,032, dated Feb. 12, 2016, Ruble et al., "3D Data Environment Disambiguation Tool", 34 pages.
Office action for U.S. Appl. No. 13/760,032 dated Sep. 10, 2015, Ruble et al., "3D Data Environment Disambiguation Tool", 31 pages.
Office action for U.S. Appl. No. 13/711,629 dated Sep. 10, 2015, Ruble et al., "Generating Queries Based Upon Data Points in a Spreadsheet Application", 33 pages.
PCT International Preliminary Report on Patentability in PCT Application No. PCT/US2013/054039, dated Feb. 19, 2015, 8 pages.
Office action for U.S. Appl. No. 13/856,476, dated Jun. 8, 2016, Fan et al., "3D Data Environment Navigation Tool ", 18 pages.
Office action for U.S. Appl. No. 13/856,476, dated Oct. 3, 2016, Fan et al., "3D Data Environment Navigation Tool ", 17 pages.
Office action for U.S. Appl. No. 13/906,343, dated Oct. 31, 2016, Ruble et al., "Facetted Browsing", 26 pages.
Pidgorny, Slawa, "3D Graphics Animations in Excel," Published on: Feb. 23, 2011, Spidgomy, available at: http://spidgomy.blogspot.com/2011/02/3d-graphics-animations-in-excel.html, 3 pages.
The Chinese Office Action dated Feb. 17, 2017 for Chinese Patent Application No. 201380042577.2, a counterpart foreign application of U.S. Appl. No. 13/760,032.
The Chinese Office Action dated Feb. 23, 2017 for Chinese Patent Application No. 201380042523.6, a counterpart foreign application of U.S. Appl. No. 13/711,629.
The Chinese Office Action dated Feb. 27, 2017 for Chinese Patent Application No. 201380042555.6, a counterpart foreign application of U.S. Appl. No. 13/856,476.
The Chinese Office Action dated Mar. 17, 2017 for Chinese patent application No. 201380042501.X, a counterpart foreign application of U.S. Appl. No. 13/856,116.
The Chinese Office Action dated Mar. 20, 2017 for Chinese patent application No. 201380042576.8, a counterpart foreign application of U.S. Appl. No. 13/898,469.
The Chinese Office Action dated Mar. 8, 2017 for Chinese patent application No. 201380042588.0, a counterpart foreign application of U.S. Appl. No. 13/835,721.
The Chinese Office Action dated Apr. 5, 2017 for Chinese Patent Application No. 201380042548.6, a counterpart foreign application of U.S. Appl. No. 13/765,695.
The European Office Action dated Jun. 9, 2017 for European Patent Application No. 13753928.4, a counterpart foreign application of U.S. Appl. No. 13/835,721, 6 pages.
Office action for U.S. Appl. No. 13/856,476, dated Mar. 23, 2017, Fan et al., "3D Data Environment Navigation Tool ", 18 pages.

(56) References Cited

OTHER PUBLICATIONS

"3D Visualization of Data in Geographical and Temporal Contexts", U.S. Appl. No. 61/681,851, (filed Aug. 10, 2012), 237 Pgs.
"U.S. Appl. No. 13/760,032, Notice of Allowance dated Jun 14, 2017", 9 pgs.
"U.S. Appl. No. 13/760,032, Notice of Allowance dated Jul. 6, 2016", 20 pgs.
"U.S. Appl. No. 13/760,032, Notice of Allowance dated Sep. 27, 2017", 11 pgs.
"U.S. Appl. No. 13/760,032, Notice of Allowance dated Dec. 2, 2016", 8 pgs.
"U.S. Appl. No. 13/760,032, Response filed Feb. 5, 2015 to Non Final Office Action dated Nov. 6, 2014", 17 pgs.
"U.S. Appl. No. 13/760,032, Response filed May 12, 2016 to Final Office Action dated Feb. 12, 2016", 17 pgs.
"U.S. Appl. No. 13/760,032, Response filed Jul. 31, 2015 to Final Office Action dated Apr. 24, 2015", 17 pgs.
"U.S. Appl. No. 13/760,032, Response filed Dec. 10, 2015 to Non Final Office Action dated Sep. 10, 2015", 17 pgs.
"U.S. Appl. No. 13/765,695, Response filed Jul. 31, 2015 to Non Final Office Action dated Apr. 24, 2015", 17 pgs.
"U.S. Appl. No. 13/856,116, Notice of Allowance dated Feb. 10, 2017", 5 pgs.
"U.S. Appl. No. 13/856,116, Notice of Allowance dated Jun. 29, 2017", 5 pgs.
"U.S. Appl. No. 13/856,116, Notice of Allowance dated Sep. 22, 2017", 5 pgs.
"U.S. Appl. No. 13/856,116, Notice of Allowance dated Nov. 4, 2016", 5 pgs.
"U.S. Appl. No. 13/856,116, Response filed Apr. 21, 2016 to Non Final Office Action dated Dec. 21, 2015", 14 pgs.
"U.S. Appl. No. 13/856,116, Response filed Aug. 21, 2015 to Non Final Office Action dated May 21, 2015", 15 pgs.
"U.S. Appl. No. 14/824,373, Preliminary Amendment filed Aug. 19, 2015", 7 pgs.
"U.S. Appl. No. 15/069,166, Non Final Office Action dated Oct. 19, 2017", 15 pgs.
"U.S. Appl. No. 15/069,166, Preliminary Amendment filed Apr. 13, 2016", 7 pgs.
"Chinese Application Serial No. 201380042555.6, Office Action dated Sep. 8, 2017", (w/ English Translation), 10 pgs.
"European Application Serial No. 13753929.2, Office Action dated Sep. 19, 2017", 6 pgs.
Webb, Chris, "Self-Service BI Mapping with Microsoft Research's Layerscape—Part 2", [online]. [retrieved on Oct. 9, 2017]. Retrieved from the Internet: <URL: https://blog.crossjoin.co.uk/2012/04/18/self-service-bi-mapping-with-microsoft-researchs-layerscapepart-2>, (Apr. 18, 2012), 6 pgs.
"Second Office Action issued in Chinese Patent Application No. 201380042548.6", dated Sep. 18, 2017, 14 Pages.
"Third Office Action Issued in Chinese Patent Application No. 201380042548.6", dated Dec. 25, 2017, 14 pages.

\* cited by examiner

THREE-DIMENSIONAL ANNOTATION FACING

CROSS-REFERENCE TO RELATED APPLICATION

This application is related to and claims the benefit of U.S. Provisional Patent Application No. 61/681,851, filed on Aug. 10, 2012, entitled "3D Visualization of Data in Geographical and Temporal Contexts," the entirety of which is hereby incorporated by reference.

BACKGROUND

A spreadsheet application, reporting application, or other data presentation application can present data in two-dimensional ("2D") and three-dimensional ("3D") pie charts, graphs, bar charts, and the like in order for users to gain insight into the data and the relationships contained therein. However, when data has a geographical component, these presentations of data can be inadequate to discover the relationships of data in the geographical context.

It is with respect to these and other consideration that the disclosure made herein is presented.

SUMMARY

Concepts and technologies are described herein for providing a 3D annotation facing tool. In accordance with some concepts and technologies disclosed herein, the 3D annotation facing tool provides a way for a user to control the orientation of annotations associated with data presented in a 3D environment. When the orientation of the data presented in the 3D environment is changed, the orientation of the annotations associated with various aspects of the data may be changed. Concepts and technologies are disclosed herein that allow for the ability to control the orientation of the annotations in order to achieve various goals, including, but not limited to, maintaining the legibility of the annotations. In one configuration, by way of example, the 3D annotation facing tool can provide a user with the ability to lock the orientation of the annotation along one or more directional axes. The 3D annotation facing tool can also provide a user with the ability to maintain an orientation of the annotation in a camera facing view.

According to one aspect disclosed herein, an illustrative computer includes a processor and a computer-readable storage medium in communication with the processor, the computer-readable storage medium having computer-executable instructions stored thereupon which, when executed by the processor, cause the processor to receive data to be rendered in a 3D environment, receive at least one annotation associated with the data, render the data in a first orientation in the 3D environment, and render the at least one annotation in a second orientation in the 3D environment. The computer-executable instructions can further include instructions to cause the processor to receive an input to change the first orientation and determine if the at least one annotation receives a special annotation orientation in relation to the input to change the first orientation.

The computer-executable instructions can further include instructions to cause the processor to, if the at least one annotation does not receive a special annotation orientation in relation to input to change the first orientation, change the first orientation and the second orientation based on the input. The computer-executable instructions can also include instructions to cause the processor to, if the at least one annotation does receive a special annotation orientation in relation to input to change the first orientation, apply the special annotation orientation to the at least one annotation, change the first orientation based on the input, and change the second orientation based on the input and the special annotation orientation.

According to another aspect disclosed herein, an illustrative method includes receiving data to be rendered in a 3D environment, receiving at least one annotation associated with the data, rendering the data in a first orientation and the at least one annotation in a second orientation in the 3D environment, and receiving an input zoom in on the data, to zoom out on the data, to pan the first orientation, or to tilt the first orientation. The illustrative method can also include determining if the at least one annotation receives a special annotation orientation in relation to the input.

The illustrative method can further include, if the at least one annotation does not receive a special annotation orientation in relation to the input, changing the first orientation and the second orientation based on the input, and, if the at least one annotation does receive a special annotation orientation in relation to the input, applying the special annotation orientation to the at least one annotation, changing the first orientation based on the input, and changing the second orientation based on the input and the special annotation orientation. The illustrative method can additionally include changing at least one aspect of the data based on changing the first orientation, the aspect comprising a height of the data or an orientation of the data.

According to a further aspect disclosed herein, an illustrative computer-readable storage medium in communication with a processor, the computer-readable storage medium having computer-executable instructions stored thereupon which, when executed by the processor, cause the processor to receive data to be rendered in a 3D environment, receive at least one annotation associated with the data, render the data in a first orientation and the at least one annotation in a second orientation in the 3D environment, and receive an input to change the first orientation.

The illustrative computer-readable storage medium can further have instructions stored thereon that, when executed by the processor, cause the processor to determine if the at least one annotation receives a special annotation orientation in relation to input to change the first orientation, the special annotation orientation including a camera facing view, wherein the first orientation is maintained constant relative to the input to change the first orientation or locking the second orientation along at least one axis of rotation, wherein locking the second orientation along at least one axis of rotation includes maintaining the at least one axis of rotation of the second orientation constant relative to the input to change the first orientation.

The illustrative computer-readable storage medium can further have instructions stored thereon that, when executed by the processor, cause the processor to, if the at least one annotation does not receive a special annotation orientation in relation to input to change the first orientation, change the first orientation and the second orientation based on the input. The illustrative computer-readable storage medium can further have instructions stored thereon that, when executed by the processor, cause the processor to, if the at least one annotation does receive a special annotation orientation in relation to input to change the first orientation, apply the special annotation orientation to the at least one annotation, change the first orientation based on the input, and change the second orientation based on the input and the special annotation orientation.

It should be appreciated that the above-described subject matter can also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
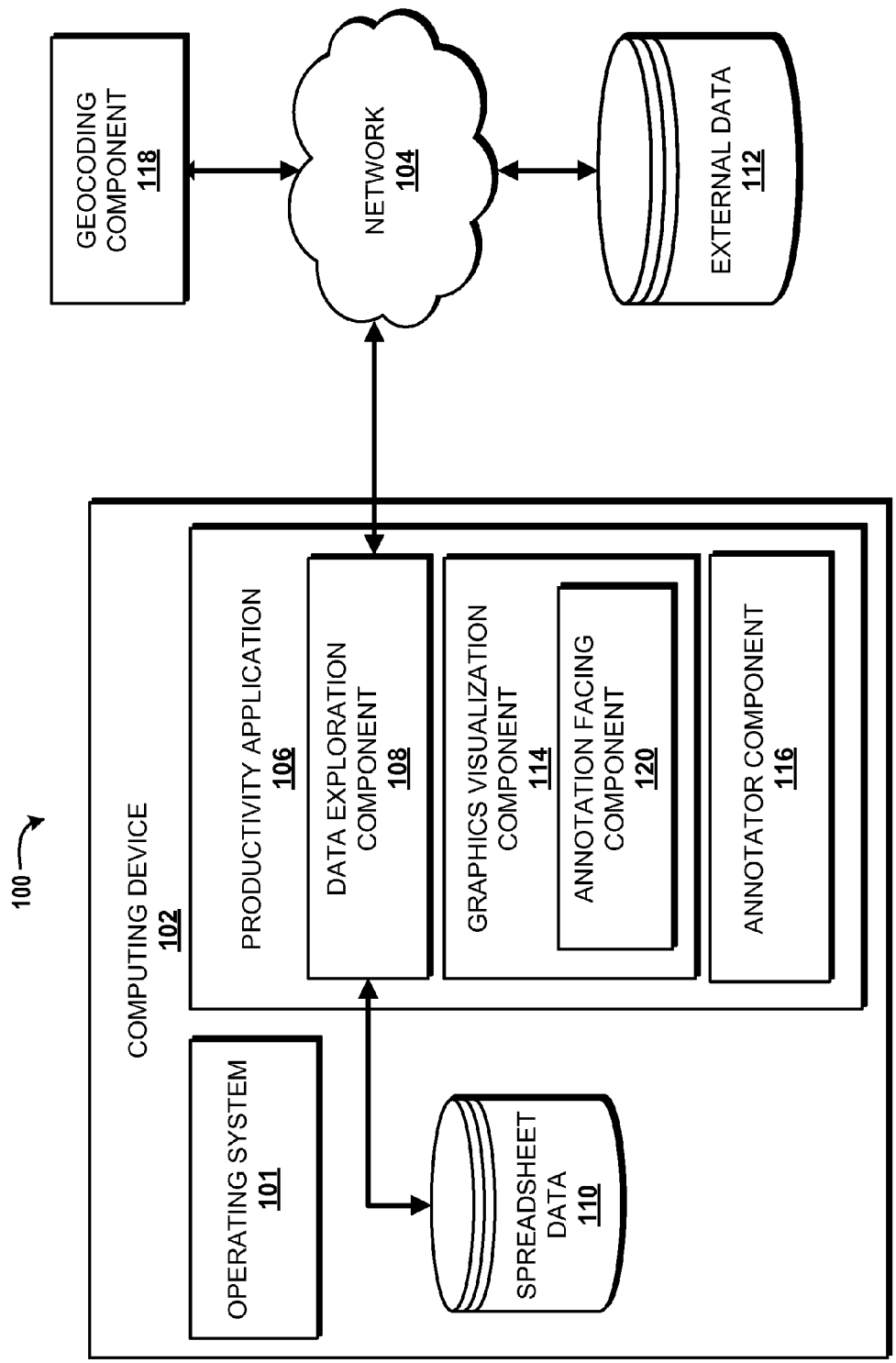
FIG. 1 is a block diagram illustrating aspects of an illustrative operating environment for implementing various embodiments presented herein.

The following detailed description is directed to concepts and technologies for providing a 3D annotation facing tool that is used to control the visual appearance and/or content of annotations of data rendered in a 3D environment. The visual appearance and/or content of annotations of data rendered in a 3D environment may be controlled to, among other possible aspects, maintain legibility of one or more of the annotations. As used herein, "legibility" means the ability of a user to read, decipher, discern, or distinguish the annotation. As discussed below, the orientation of text can affect the legibility of the annotation, as well as other quantitative or qualitative measurements. In some examples, the 3D annotation facing tool can lock the orientation of the annotation along one or more directional axes. In other examples, the 3D annotation facing tool can maintain an orientation of the annotation in a camera facing view. In still further examples, the 3D annotation facing tool can change various aspects of the annotations based on one inputs to change an orientation of the 3D environment in which the annotations are rendered.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for a 3D annotation facing tool and other aspects will be presented. As used herein, the term 3D includes the simulation of a three dimensional space. In some examples, the three dimensions are represented by a spatial coordinate system, such as a 3-dimensional Euclidean space having three directional axes (i.e. X, Y, and Z). As used herein, an "orientation" of an element in a 3D environment is based on coordinates along the three directional axes. Further, as used herein, a change in the orientation of an element in a 3D environment includes changing the coordinates of the element along at least one of the three directional axes.

Referring now to FIG. 1, aspects of an operating environment 100 for the various embodiments presented herein will be described. The operating environment 100 shown in FIG. 1 includes a computing device 102 operating in communication with a network 104. In some embodiments, the computing device 102 is a desktop computer, a laptop computer, a notebook computer, an ultra-portable computer, a netbook computer, or a computing device such as a mobile telephone, a tablet device, a slate device, a portable video game device, or the like. Illustrative architectures for the computing device 102 are illustrated and described herein below with reference to FIGS. 9 and 11.

An operating system 101 is executing on the computing device 102. The operating system 101 executes a productivity application 106. In some embodiments, the productivity application 106 includes, but is not limited to, one or more productivity application programs that are part of a MICROSOFT OFFICE suite of application programs, such as a MICROSOFT WORD application program, a MICROSOFT EXCEL application program, a MICROSOFT POWERPOINT application program, a MICROSOFT ACCESS application program, a MICROSOFT VISIO application program, a MICROSOFT OUTLOOK application program, and the like. For example, the productivity application 106 can include the MICROSOFT EXCEL application program. The MICROSOFT EXCEL application program is a spreadsheet application featuring various functionality including, but not limited to, calculation, graphing tools, data pivot tables, and a macro programming language called VISUAL BASIC for APPLICATIONS ("VBA"). The productivity application 106 can be used as a standalone application, but can also operate in conjunction with a MICROSOFT EXCHANGE server to provide enhanced functions for multiple users within an enterprise, such as, but not limited to, enterprise-wide collaboration.

In some examples, the productivity application 106 can be used to receive and analyze data in various formats. It should be appreciated that the present disclosure is described in certain configurations as using "productivity data" for descriptive purposes only, as the present disclosure is not limited to any one type of data. In some examples, productivity data can be data associated with various conditions, events, workflow processes, business environments, and the like, with which a user can use the productivity application 106.

In various embodiments, the productivity application 106 includes a data exploration component 108. The data exploration component 108 provides a user operating or interfacing with the computing device 102 the ability to search for and retrieve data from various sources and integrate that data into work being performed using the productivity application 106. The data exploration component 108 can retrieve data locally from spreadsheet data 110 or from one or more remote databases, such as external data 112. It should be appreciated that the spreadsheet data 110 and external data 112 can include one or more databases located on one or more local or remote computing devices, the present disclosure of which is not limited to any particular configuration.

In one embodiment, the data exploration component 108 is accessed by the productivity application 106 when a search for data from the spreadsheet data 110 is performed. In addition, the data exploration component 108 can be used for other various purposes, including, but not limited to, mining for data, determining relationships or patterns in the data, understanding clusters of data. The data exploration component 108 can also be used to search for and discover various insights into the external data 112. In one example, the data exploration component 108 interfaces with the network 104 through various interfaces to retrieve data from the external data 112.

As discussed previously, it can be beneficial for a user to cause the productivity application 106 to render certain data in the spreadsheet data 110 and/or the external data 112 in a 3D environment. A graphics visualization component 114 of the productivity application 106 receives the selected data to be rendered in a 3D environment and causes that selected data to be rendered in a 3D environment. The rendering of data within a 3D environment may be implemented using various techniques, the present disclosure of which is not limited to any particular kind. For example, the productivity application 106 can have various default settings that assign 3D values to various types of data. For example, the productivity application 106 can have a default setting that assigns a first column of data in a spreadsheet to one spatial coordinate, a second column of data to a second spatial coordinate, and a third column of data to a third spatial coordinate. Each row of data selected can thereafter be rendered in a 3D environment using the spatial coordinates as locations. In another example, a user can assign spatial coordinates to various data.

In some instances, after having the selected data rendered in a 3D environment, a user may want to insert for viewing, i.e. annotate, additional information about the rendered data in the 3D environment. A user can use an annotator component 116 in conjunction with the graphics visualization component 114 to annotate various selected data and have those annotations rendered in a 3D environment. For example, a user can select certain data in a spreadsheet that has data which includes stores selling a particular item in a particular city, the location of the stores, and additional data associated with the stores. The user can use the graphics visualization component 114 to cause the selected data to be rendered in a 3D environment. To provide additional visual information, the user may want to annotate the data rendered in the 3D environment. To do so, the user can use the annotator component 116 to cause various types of annotations to be rendered with the selected data in the 3D environment. The annotations can be created by the graphics visualization component 114, created by a user, or various combinations thereof.

As described above, a user may want to manipulate the orientation of, or "tour", a 3D environment in which data has been rendered. In some configurations, a user can input various navigation controls to change the orientation of the 3D environment, the navigation controls including, but not limited to, inputs to pan, pitch, roll, yaw, zoom, tilt, and/or rotate the 3D environment. As used herein, "tour" includes a visualization of data in more than one viewing aspect. Further, as used herein, a "viewing aspect" includes the visual appearance of the 3D environment to a user viewing the 3D environment.

If the 3D environment includes geographical information, the data exploration component 108 can interface with the network 104 to retrieve geographic data from a geocoding component 118. The geocoding component 118 can provide data relating various geographies and locations. The geocoding component 118 can retrieve data from various sources, including the external data 112 or other data sources such as the BING mapping services provided by MICROSOFT CORPORATION. Data from the geocoding component 118 can be integrated with data contained in the spreadsheet data 110 to provide a 3D geographical visualization of data.

In an example of the use of geographical information, a user can select data from the spreadsheet data 110 and have that data augmented with geographical information received from the geocoding component 118. Further, the user can determine one or more annotations to be associated with the data to be rendered in the 3D environment using the annotator component 116. The graphics visualization component 114 receives the selected data, the geographical information, and the annotations and renders them in a 3D environment using the graphics visualization component 114. In this example, by augmenting the selected data with geographical information, the data can be presented in a virtual 3D space simulating a real location. Various embodiments and examples of 3D geographical visualization are provided in greater detail below.

Once rendered, a user may want to tour the data by changing the orientation of the data along various directional axes. The change in the orientation of the 3D environment can affect the annotations associated with one or more data rendered in the 3D environment. In some instances, it may be preferable to determine how the orientation of the annotation is affected by an input to change the orientation of the 3D environment by using an annotation facing component 120. The annotation facing component 120 is used by the productivity application 106 to determine how the orientation of one or more annotations are changed by an input to change the orientation of the 3D environment in which the annotations are rendered.

The graphics visualization component 114 receives an input from the data exploration component 108 that an input to change the orientation of the 3D environment has been received. The annotation facing component 120 provides an input to the graphics visualization component 114 on how the orientation of one or more of the annotations in the 3D environment should be changed based on the input to change the orientation of the 3D environment. The graphics visualization component 114 receives the input from the annotation facing component 120 and changes the orientation of the annotations based on the input received from the annotation facing component 120. It should be understood that although the annotation facing component 120 is illustrated as being part of the graphics visualization component 114, the annotation facing component 120, like other components or features described herein, can be provided by separate systems or components, the present disclosure of which is not limited to any one particular configuration.

Figure 2:
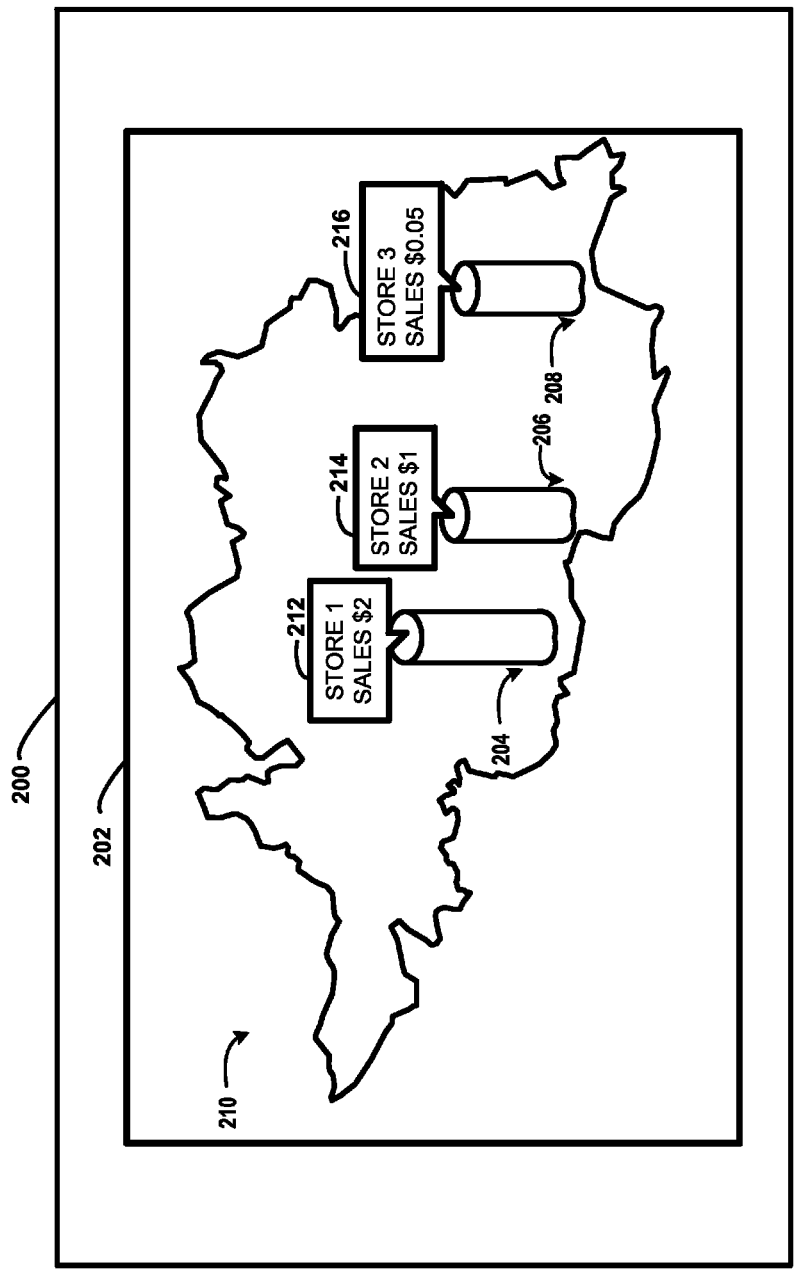
FIG. 2 is an illustration showing a rendering of data and annotations associated with that data, in accordance with some embodiments.

FIG. 2 illustrates an exemplary display 200 in which annotated data can be presented in a 3D visualization. A productivity application, such as the productivity application 106 of FIG. 1, has rendered a 3D visualization 202 within the display 200. Illustrated in FIG. 2 are data 204 relating to "Store 1", data 206 relating to "Store 2" and data 208 relating to "Store 3". As described in relation to FIG. 1, geographic data can be associated with the data 204, the data 206, or the data 208 by using the geocoding component 118.

As illustrated, the data 204, the data 206 and the data 208 are annotated in relation to geographic locations on a map 210. The data 204 has been annotated with an annotation 212, showing the store name, i.e. "STORE 1", and the sales data, i.e. "SALES $2". In a similar manner, the data 206 has been annotated with an annotation 214, showing the store name, i.e. "STORE 2", and the sales data, i.e. "SALES $1". Additionally, in a similar manner, the data 208 has been annotated with an annotation 216, showing the store name, i.e. "STORE 3", and the sales data, i.e. "SALES $0.05".

As described above, a user may want to tour the data rendered in the 3D environment. As a user tours the data, the orientations of the annotations, as well as other aspects of the annotations, may change depending on the configuration of the annotations. For example, one way in which movement can be effected is to zoom in on the 3D visualization of the data to focus on one or more data. Thus, a user can use a zoom feature provided in a graphics visualization component, such as the graphics visualization component 114 of FIG. 1, to show the one or more data in greater detail and/or size.

Figure 3:
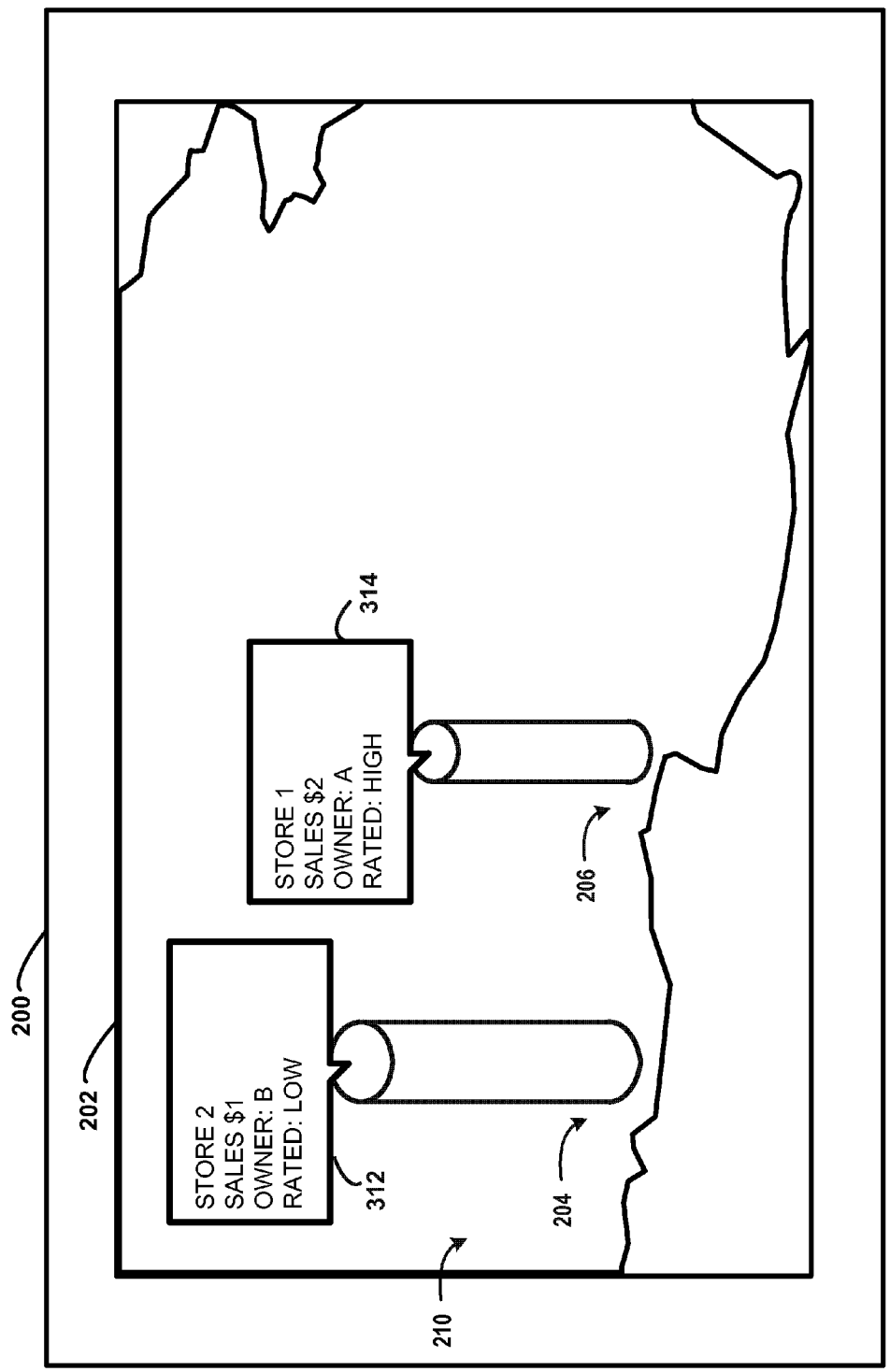
FIG. 3 is an illustration showing a rendering of data and annotations associated with that data when zooming in on the data, in accordance with some embodiments.

FIG. 3 is an illustration of the map 210 of FIG. 2 after a zoom in input is received. The map 210 has displayed thereon the data 204 and the data 206. The data 204 and the data 206 are annotated and rendered in a 3D visualization using geographical data. When a user zooms in on the map 210, the annotations associated with the data 204 and/or the data 206 can be modified. For example, annotated data 312 is a "zoomed" version of the annotated data 212 associated with the data 204. While the annotated data 212 in the map 210 of FIG. 2 may have displayed the store name and sales, the zoomed version of the annotated data 212, i.e. the annotation 312 has the store name, i.e. "STORE 1", the sales data, i.e. "SALES $2", the name of the owner, i.e. "A", and the rating of the store, i.e. "HIGH".

In a similar manner, the data 206 has the annotation 314 which has the store name, i.e. "STORE 2", the sales data, i.e. "SALES $1", the name of the owner, i.e. "B", and the rating of the store, i.e. "LOW". As illustrated in FIG. 3, the annotation can be changed based on how the orientation of the 3D environment. In the examples illustrated in FIGS. 2 and 3, zooming in and out can increase or decrease the amount of information displayed in the annotation 312 or the annotation 314. It should be understood that the annotation 312 or the annotation 314 can be modified in other ways, the present disclosure of which is not limited to any particular way. FIGS. 4-7, and their accompanying description, provide other examples of how annotations in a 3D environment can be controlled or changed based on an input to change the orientation of the 3D environment.

Figure 4:
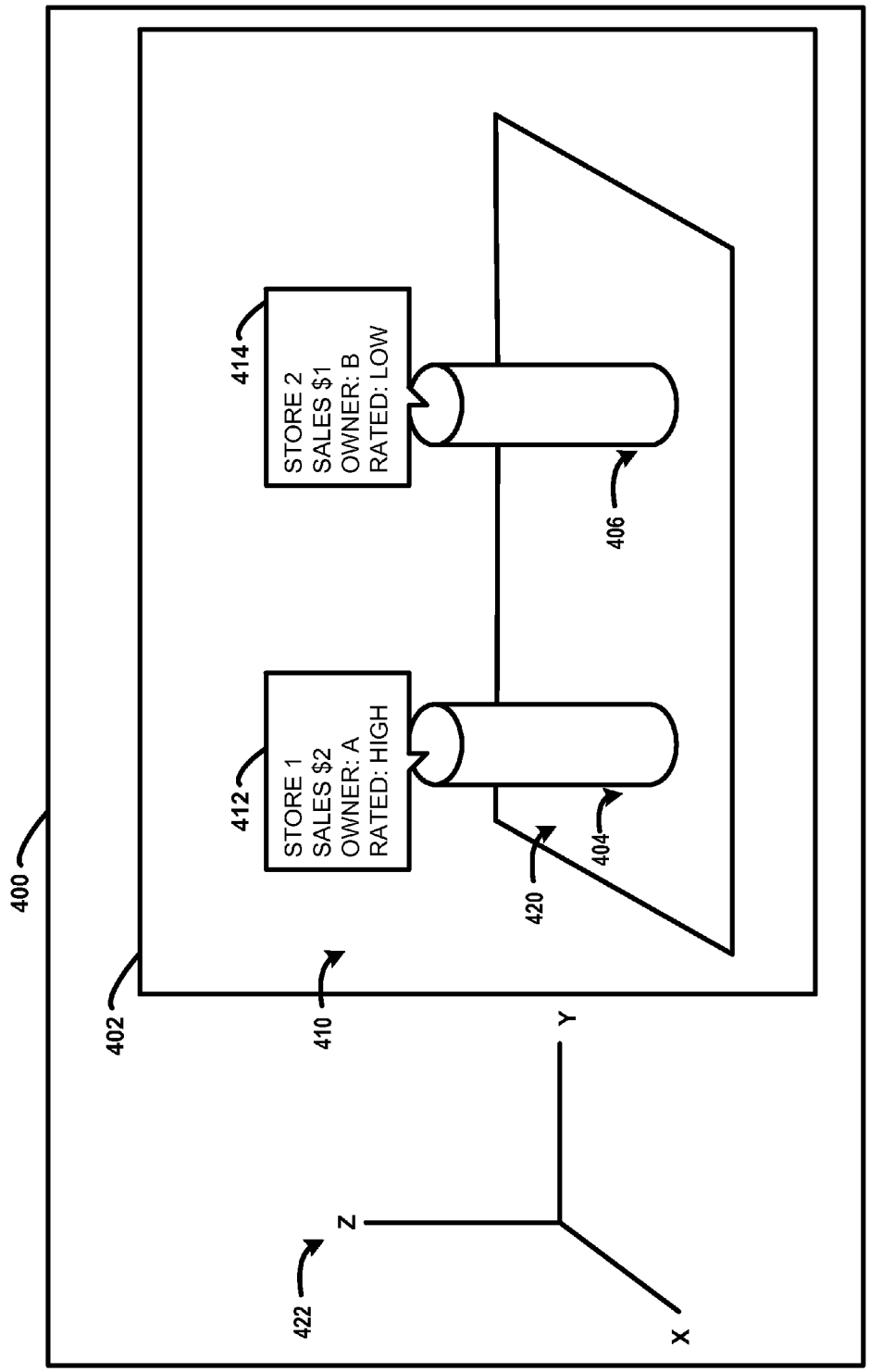
FIG. 4 is an illustration showing a rendering of data and annotations associated with that data in a 3D space, in accordance with some embodiments.

FIG. 4 is an illustration showing an initial 3D visualization of annotated data. A display 400 has rendered thereon a 3D environment 402 including a 3D visualization 410. In a manner similar to the map 210 of FIG. 2 or 3, the 3D visualization 410 can encompass various aspects of a 3D experience. In the example illustrated in FIG. 4, the 3D visualization 410 is a rendering of annotated data 404 associated with an annotation 412 and annotated data 406 associated with an annotation 414. The annotated data 404 and 406 and the annotations 412 and 414 are illustrated as being rendered in a 3D space 420.

A user can manipulate the orientation of the 3D space 420 to, among other things, pan, zoom, tilt, pitch, yaw and rotate the 3D space 420 about various axes, represented in FIG. 4 as spatial axis 422. For example, a user can move the 3D space 420 along the X-axis, Y-axis and/or Z-axis of the spatial axis 422 to move 3D space 420 to various locations within the 3D visualization 410. Additionally, the user can rotate the 3D space 420 about the X-axis, Y-axis and/or Z-axis of the spatial axis 422 to pan, pitch, yaw or rotate the 3D space 420.

The annotations 412 and 414 are shown in a certain orientation in relation to the spatial axis 422. The initial orientation of the annotations 412 and 414 can be a default setting or can be adjusted depending on how a user wishes to view an initial 3D space, the present disclosure of which is not limited to any particular initial configuration. Further, it should be understood that, although the annotations 412 and 414 are shown initially in the same or similar orientation, the present disclosure is not limited to that particular type of configuration, as the initial orientations of the annotations 412 and 414 can be adjusted by design or by a user, for example.

Figure 5:
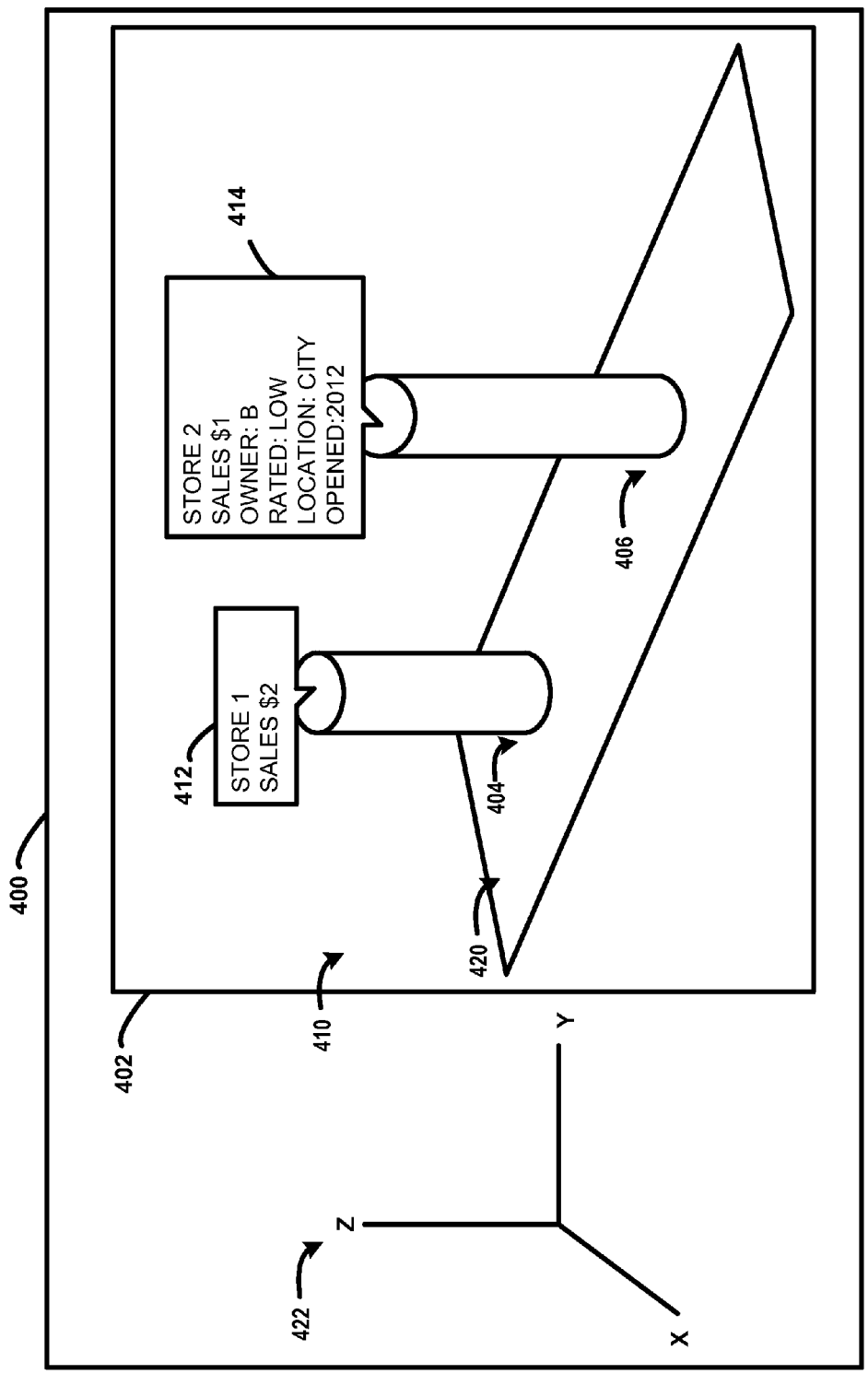
FIG. 5 is an illustration showing a rendering of data and annotations associated with that data when the 3D space orientation is rotated, wherein the annotations are in a camera facing view, in accordance with some embodiments.

FIG. 5 illustrates one example of how the orientation of an annotation can be determined (or controlled). FIG. 5 illustrates an embodiment that can be called "camera facing view". When comparing annotations 412 and 414 as illustrated in FIG. 4 and annotations 412 and 414 as illustrated in FIG. 5, it can be seen that annotations 412 and 414, despite their change in information presented, have the same orientation. Thus, in this example, even though 3D space 420 is rotated and moved about one or more axes of spatial axes 422 the annotations 412 and 414 are maintained in the same orientation. This can provide the user with several benefits, such as, but not limited to, a constant viewing experience.

FIG. 5 also illustrates how the shape and size of the rendered data and/or annotations may be changed based on an input to change the orientation of the 3D space 420. As previously described, the 3D space 420 has been rotated about the Z-axis of the spatial axis 422. The annotated data 404 is placed further in the background of the 3D visualization 410 and the annotated data 406 is moved to a location closer to the foreground of the 3D visualization 410. In some configurations, when an object in a 3D environment is placed in the foreground in relation to another similarly sized object which is located in the background, it can be beneficial to render the object in the foreground as larger in size than an object rendered in the background. Thus, in this example, the annotated data 404 is shown having a smaller height relative to the annotated data 406.

FIG. 5 also illustrates how the information displayed in an annotation can be modified based on the change in location of the annotation. In the example illustrated in FIG. 5, the annotated data 406 is "closer," i.e. placed closer to the foreground, to a viewer of the 3D space 420 and the annotated data 404 is "farther away," i.e. placed closer to the background in relation to the annotated data 406, to a viewer of 3D visualization 410. In response to the change in location in 3D visualization 410, the annotation 412 has been modified to display less data. Additionally, in response to a change in location in 3D visualization 410, the annotation 414 has been modified to display more information. As illustrated, the annotation 412 displays the store name and sales, which is a reduction in data displayed by annotation 412 in FIG. 4. In a similar manner, the annotation 414 in FIG. 5 displays more information than what the annotation 414 displayed in FIG. 4, including a location and a date that the store opened.

Figure 6:
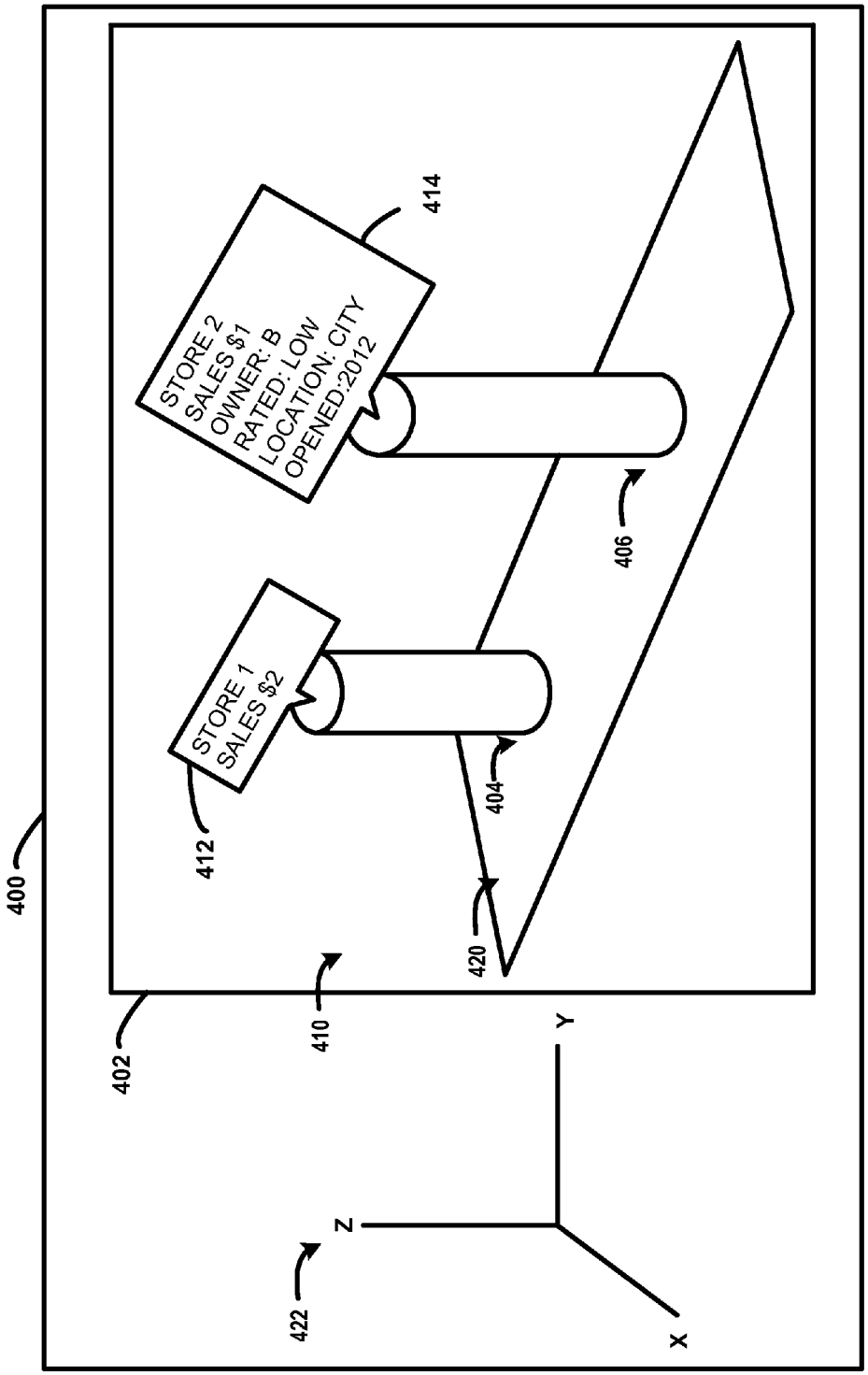
FIG. 6 is an illustration showing a rendering of data and annotations associated with that data when the 3D space orientation is rotated, wherein the annotations do not have a special annotation orientation applied to the annotations, in accordance with some embodiments.

FIG. 6 illustrates another way in which the orientation of an annotation can be changed (controlled), wherein one or more of the annotations are "locked" in a certain orientation. As used herein, "locked" includes maintaining an annotation in a certain orientation based on specified changes to the orientation of 3D space 420. If the annotations 412 and/or 414 are not locked along a certain orientation, or placed in "camera facing view" as illustrated in FIG. 5, when the orientation of 3D space 420 is changed, the annotations 412 and/or 414 can be rendered in a visually unpleasing way, as illustrated in FIG. 6. In FIG. 6, 3D space 420 has been rotated in a manner similar to FIG. 5, but instead of annotations 412 and 414 being placed in a "camera facing view", whereby the orientations of annotations 412 and 414 are maintained, in FIG. 6, annotations 412 and 414 have been rotated in a manner similar to the rotation applied to 3D space 420. Thus, the orientation of annotation 412 of the annotated data 404 and the annotation 414 of the annotated data 406 are illustrated as being skewed, which can be difficult for a viewer to see, and at least, can be visually unpleasant. It should be understood, though, that in some examples, it can be desirable to lock the orientation of annotations 412 and/or 414 to provide, for example, an enhanced 3D experience.

Figure 7:
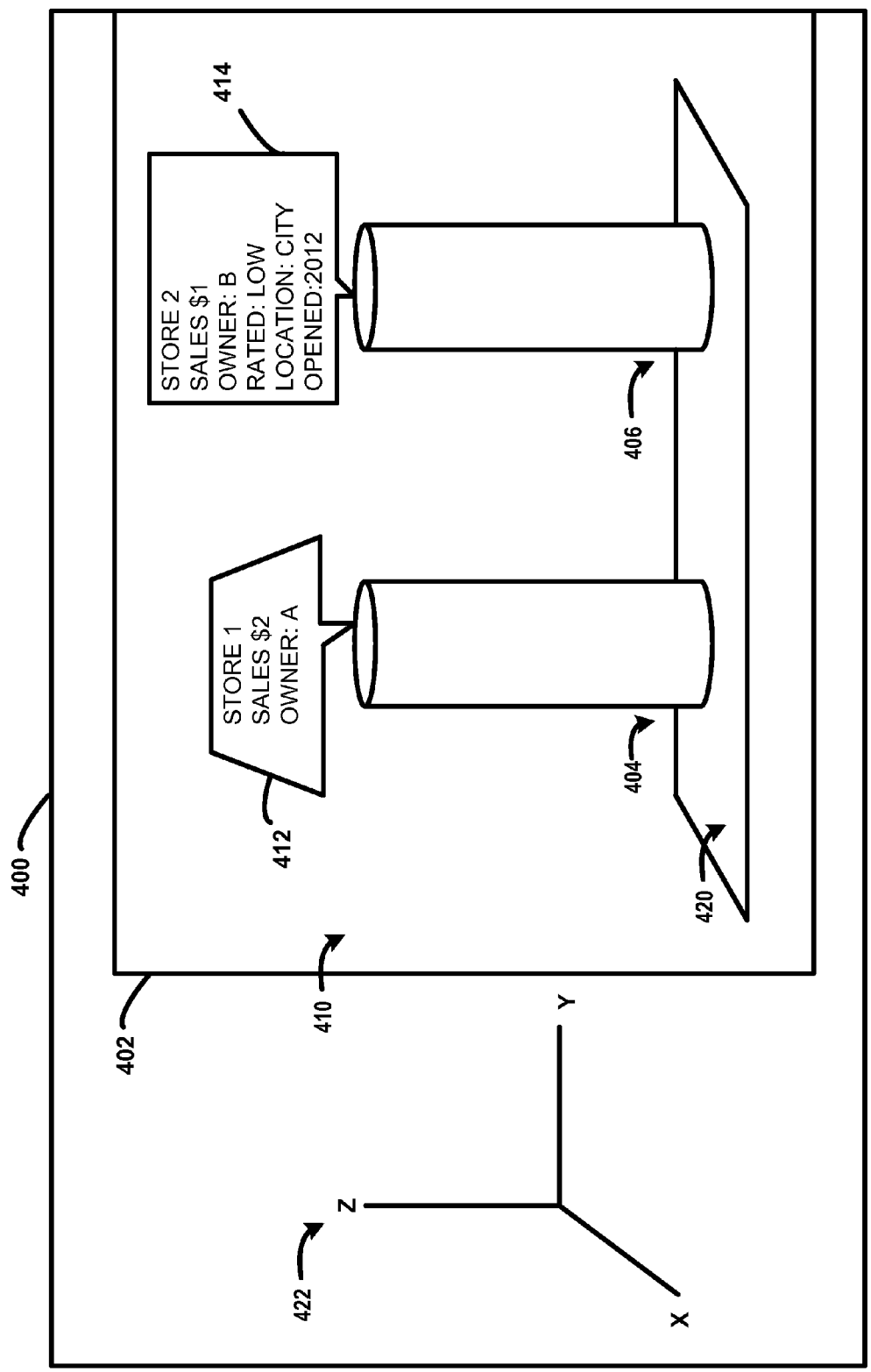
FIG. 7 is an illustration showing a rendering of data and annotations associated with that data when the 3D space orientation is rotated, wherein the annotations are locked in the Y-axis, in accordance with some embodiments.

FIG. 7 illustrates another example in which the orientation of annotations 412 and/or 414 can be modified in relation to the orientation of 3D space 420 can be to lock annotations 412 and/or 414 about a certain axis, as illustrated by way of example in FIG. 7. FIG. 7 is an illustration showing 3D space 420 of FIG. 4 being rotated about Y-axis of the spatial axes 422. Annotation 412 of annotated data 404 is shown having a skewed view when compared to the view of annotation 412 in FIG. 4. The reason in the example provided in FIG. 7 is that the view of annotation 412 has been locked in relation to rotation about the Y-axis of spatial axes 422. Thus, when a user rotates 3D space 420 about the Y-axis of the spatial axes 422, the same rotation is applied to annotation 412. For comparison, the annotation 414 of the annotated data 406 is shown in the camera facing view configuration, whereby the orientation of annotation 414 is maintained in the same position regardless of any rotation applied to 3D space 420.

As described above in relation to FIGS. 2, 3 and 5, when the view of annotated data within a 3D visualization is changed, the information presented within the annotation can be changed. It should be noted that the present disclosure is not limited to annotations with information that is changed when the view is changed, as the information displayed in an annotation can be configured to remain constant. As illustrated by way of example in FIGS. 2, 3 and 5, when the view of the annotated data 404 and 406 are changed, the information displayed in annotations 412 and 414 can also be changed. FIG. 7 illustrates another example of changing information. Because 3D space 420 was rotated about the Y-axis of the spatial axes 422, and because annotation 412 is locked in the Y-axis, the size of annotation 412 can change, as illustrated in FIG. 7. Because the size of annotation 412 has been changed, it can be desirable to change the information displayed therein. As illustrated, whereby annotation 414 displays the store name, sales figures, owner, rating, location and the date the store opened, annotation 412 has been modified to display only the store name, sales figures and the store owner.

Figure 8:
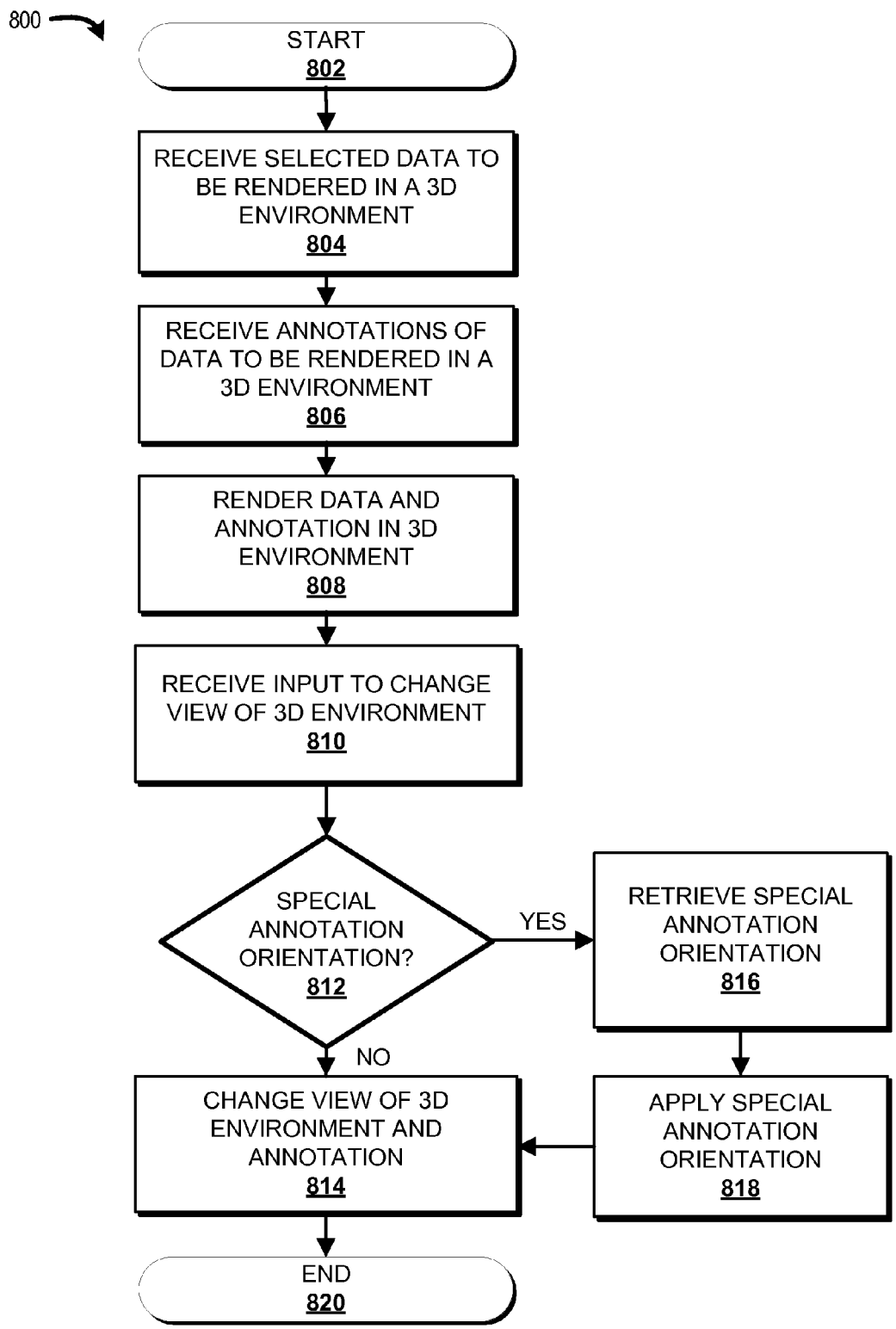
FIG. 8 is a flow diagram showing aspects of a method for providing a 3D annotation facing tool, in accordance with some embodiments.

Turning now to FIG. 8, aspects of a method 800 for providing and modifying annotations within a 3D environment are illustrated, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof.

The operations of the method 800 are described herein below as being implemented, at least in part, by the productivity application 106, the data exploration component 108, the graphics visualization component 114, the annotator component 116 and the annotation facing component 120 or some combination thereof. One or more of the operations of the method 800 can alternatively or additionally be implemented, at least in part, by the similar components in either the computing device 102 or a similarly configured computer.

The method 800 begins at operation 802 and proceeds to operation 804, wherein the selected data to be rendered in a 3D environment is received. As described above, a user can select one or more data to be graphically visualized in a 3D environment. In some examples, it can be beneficial to not only graphically represent the data, but also, to annotate the data with information.

From operation 804, the method 800 proceeds to operation 806, wherein annotations of the selected data to be rendered in a 3D environment are received. The annotations can vary depending on the particular configuration or available features in the productivity application 106 or as can be selected by a user using the productivity application 106. The type of annotation can vary, the present disclosure of which is not limited to any particular kind. For example, annotations can be specific data associated with or related to the data selected in operation 804. In another example, annotations can be visual annotations such as colors, shapes or sizes applied to one or more visual graphics associated with data selected in operation 804.

From operation 804, the method 800 proceeds to operation 808, wherein the data and annotations are rendered in a 3D environment. The rendering of the data and annotation can vary depending on the particular configuration or features available in the productivity application 106 or as can be selected by a user or other person implementing the technologies disclosed herein. The rendering view can vary depending on the data selected for rendering. For example, FIGS. 2 and 3 illustrate the rendering of data and annotations in a 3D environment, wherein the 3D environment has geocoding information to render the data on a map.

If a user or another individual wishes to explore, or "tour" the 3D environment, the user can manipulate one or more controls to modify the view of the 3D visualization. If an input is received to change the view of the 3D environment at operation 810, the method 800 proceeds to operation 812, wherein a determination is made as to whether or not the annotation should receive a special orientation in relation to the orientation change applied to the 3D environment. If it is determined that no special orientation should be applied to the annotation, the method 800 proceeds to operation 814, wherein the change in orientation is applied to the 3D environment and the annotation in a similar manner and the method 800 proceeds to end at operation 820.

If it is determined that one or more annotations within 3D environment are to receive a special orientation in relation to changes in the orientation of the 3D environment, the method 800 proceeds from operation 812 to operation 816, wherein the special orientation is retrieved. As described above, the view of the annotations can be changed to accommodate various features. In one example, one or more of the annotations can be configured to remain in "camera facing view," wherein the orientation of the annotations remain constant irrespective of any orientation changes to the 3D environment.

In another example, one or more of the annotations can be "locked" in one or more axis of rotation but can be maintained in other directional axes. For example, annotation 412 of FIG. 7 is shown as being locked to the rotation of the 3D space 420 in the Y-direction. Therefore, any changes in the Y-axis applied to the 3D space 420 would be similarly applied to the annotation 412. But, if the 3D space 420 is rotated in other axes, those changes are not reflected in a change to the annotation 412 unless the annotation 412 is also locked to those axes as well.

Additionally, the information provided in one or more of the annotations can be changed at operation 816. For example, a 3D space or environment can be zoomed in on by a user. Depending on the configuration of the productivity application or other settings, the annotations illustrated can be altered. One example is illustrated by way of FIGS. 2 and 3. The annotation 312 and the annotation 314 in FIG. 3 show additional information than that which was provided in FIG. 2. In that example, a zoom feature was applied and the two data 204 and 206 were zoomed in on. In that example, it was determined that additional information was valuable when annotated data is zoomed in on. It should be noted that the same increase or decrease of data can be applied in other orientation modifications, the present disclosure of which is not limited to any one type of orientation modification. The special annotation orientation is retrieved at operation 816 and the method 800 proceeds to operation 818, wherein the special annotation orientation is applied in conjunction with the method at operation 814. The method 800 proceeds to end at operation 820.

Figure 9:
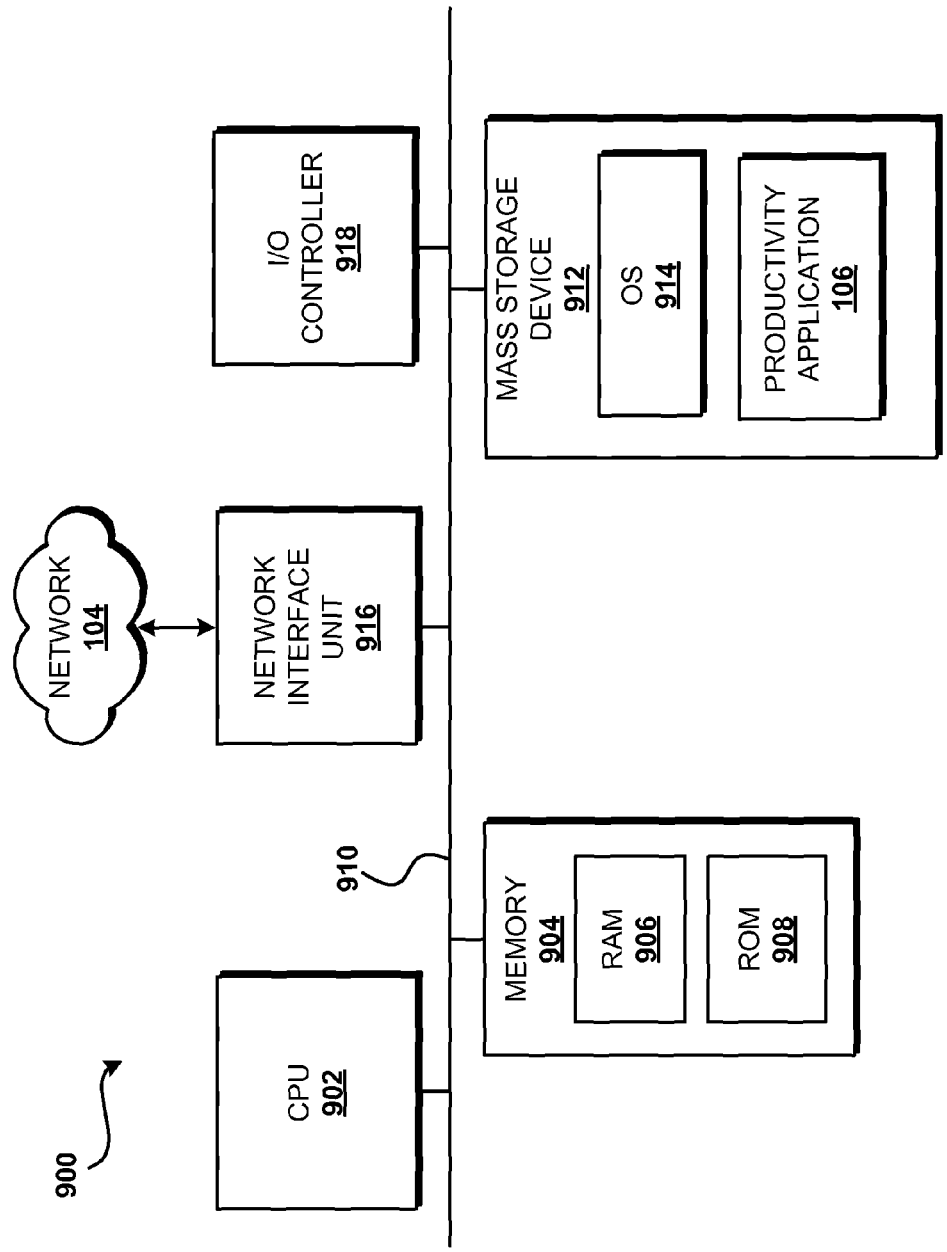
FIG. 9 is a computer architecture diagram illustrating an illustrative computer hardware and software architecture for a computing system capable of implementing aspects of the embodiments presented herein.

FIG. 9 illustrates an illustrative computer architecture 900 for a device capable of executing the software components described herein for providing a 3D annotation facing tool. Thus, the computer architecture 900 illustrated in FIG. 9 illustrates an architecture for a server computer, mobile phone, a PDA, a smart phone, a desktop computer, a netbook computer, a tablet computer, and/or a laptop computer. The computer architecture 900 can be utilized to execute any aspects of the software components presented herein.

The computer architecture 900 illustrated in FIG. 9 includes a central processing unit 1002 ("CPU"), a system memory 1004, including a random access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 908. The computer architecture 900 further includes a mass storage device 912 for storing the operating system 101 from FIG. 1 and one or more application programs including, but not limited to, productivity application 106.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 900. For purposes of the claims, the phrase "computer storage medium," and variations thereof, does not include waves or signals per se and/or communication media.

According to various embodiments, the computer architecture 900 operates in a networked environment using logical connections to remote computers through a network such as the network 104. The computer architecture 900 can connect to the network 104 through a network interface unit 916 connected to the bus 910. It should be appreciated that the network interface unit 916 also can be utilized to connect to other types of networks and remote computer systems. The computer architecture 900 also can include an input/output controller 918 for receiving and processing input from a number of other devices, including a keyboard, mouse, or electronic stylus (illustrated by way of example in FIG. 13). Similarly, the input/output controller 918 can provide output to a display screen, a printer, or other type of output device.

It should be appreciated that the software components described herein can, when loaded into the CPU 902 and executed, transform the CPU 902 and the overall computer architecture 900 from a general-purpose computing system into a special-purpose computing system customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 900 in order to store and execute the software components presented herein. It also should be appreciated that the computer architecture 900 can include other types of computing devices, including hand-held computers, embedded computer systems, personal digital assistants, and other types of computing devices known to those skilled in the art. It is also contemplated that the computer architecture 900 may not include all of the components shown in FIG. 9, can include other components that are not explicitly shown in FIG. 9, or can utilize an architecture completely different than that shown in FIG. 9.

Figure 10:
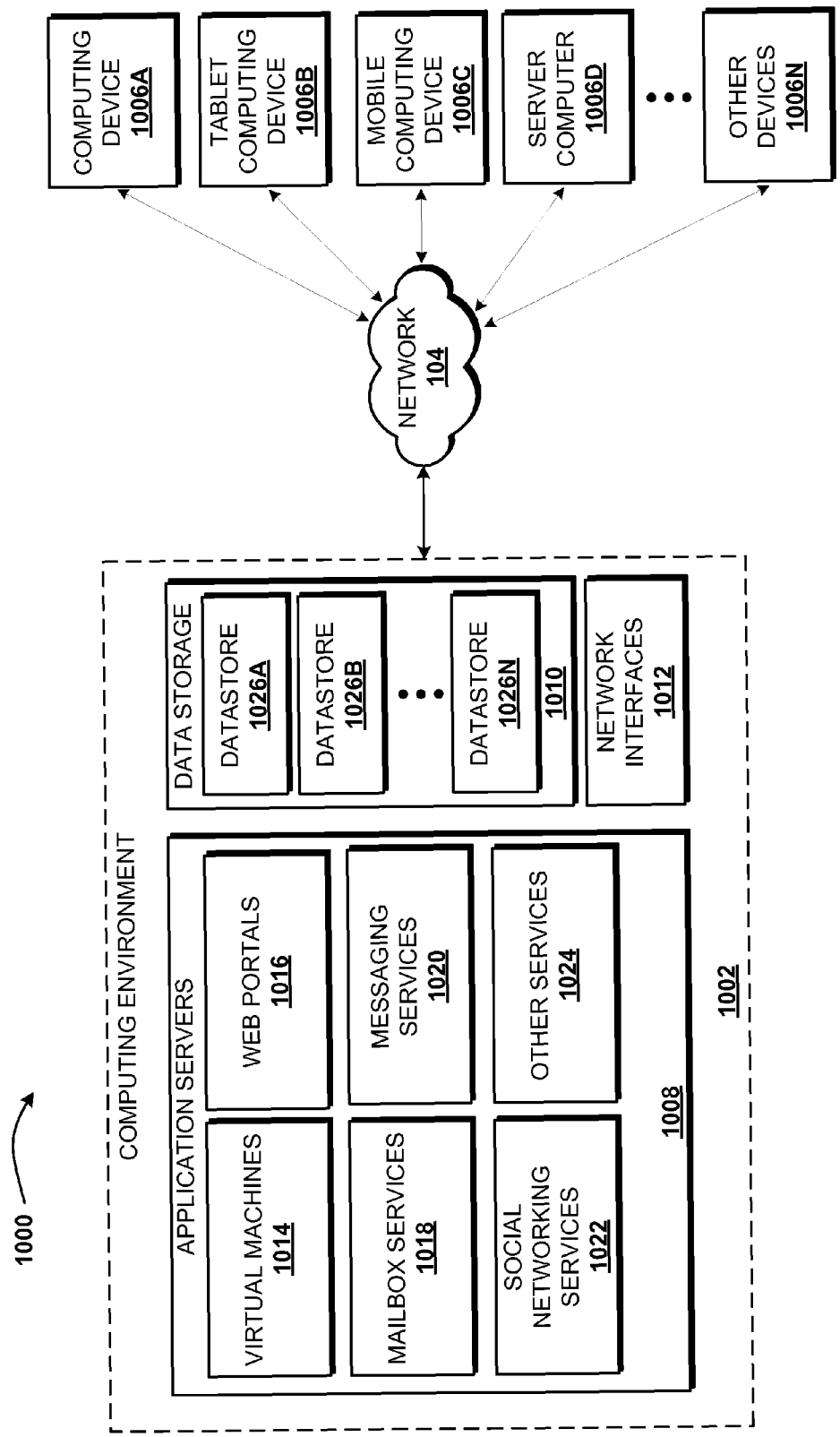
FIG. 10 is a diagram illustrating a distributed computing environment capable of implementing aspects of the embodiments presented herein.

FIG. 10 illustrates an illustrative distributed computing environment 1000 capable of executing the software components described herein for providing a 3D annotation facing tool. Thus, the distributed computing environment 1000 illustrated in FIG. 10 can be used to provide the functionality described herein. The distributed computing environment 1000 thus can be utilized to execute any aspects of the software components presented herein.

According to various implementations, the distributed computing environment 1000 includes a computing environment 1002 operating on, in communication with, or as part of the network 104. The network 104 also can include various access networks. One or more client devices 1006A-1006N (hereinafter referred to collectively and/or generically as "clients 1006") can communicate with the computing environment 1002 via the network 104 and/or other connections (not illustrated in FIG. 10). In the illustrated embodiment, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. It should be understood that the illustrated clients 1006 and computing architectures illustrated and described herein are illustrative, and should not be construed as being limited in any way.

In the illustrated embodiment, the computing environment 1002 includes application servers 1008, data storage 1010, and one or more network interfaces 1012. According to various implementations, the functionality of the application servers 1008 can be provided by one or more server computers that are executing as part of, or in communication with, the network 104. The application servers 1008 can host various services, virtual machines, portals, and/or other resources. In the illustrated embodiment, the application servers 1008 host one or more virtual machines 1014 for hosting applications or other functionality. According to various implementations, the virtual machines 1014 host one or more applications and/or software modules for providing the functionality described herein for providing a 3D annotation facing tool. It should be understood that this embodiment is illustrative, and should not be construed as being limiting in any way. The application servers 1008 also host or provide access to one or more Web portals, link pages, Web sites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") services including, but not limited to, calendar services, contact management services, collaboration services, and/or other services. The messaging services 1020 can include, but are not limited to, instant messaging services, chat services, forum services, and/or other communication services.

The application servers 1008 also can include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 1022 are provided by other services, sites, and/or providers that can or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1022 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above embodiments are illustrative, and should not be construed as being limited in any way.

As shown in FIG. 10, the application servers 1008 also can host other services, applications, portals, and/or other resources ("other resources") 1024. The other resources 1024 can include, but are not limited to, the data exploration component 108, the graphics visualization component 114, and the annotation facing component 120. It thus can be appreciated that the computing environment 1002 can provide integration of the concepts and technologies with various mailbox, messaging, social networking, and/or other services or resources. For example, the concepts and technologies disclosed herein can integrated social networking information into various searches and provide those results to a user in conjunction with internal knowledge.

As described above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store databases 224A-224N in database 224 shown in FIG. 2.

The computing environment 1002 can communicate with, or be accessed by, the network interfaces 1012. The network interfaces 1012 can include various types of network hardware and software for supporting communications between two or more computing devices including, but not limited to, the clients 1006 and the application servers 1008. It should be appreciated that the network interfaces 1012 also can be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the clients 1006. It should be understood that the clients 1006 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1000 to utilize the functionality described herein for providing a 3D annotation facing tool.

Figure 11:
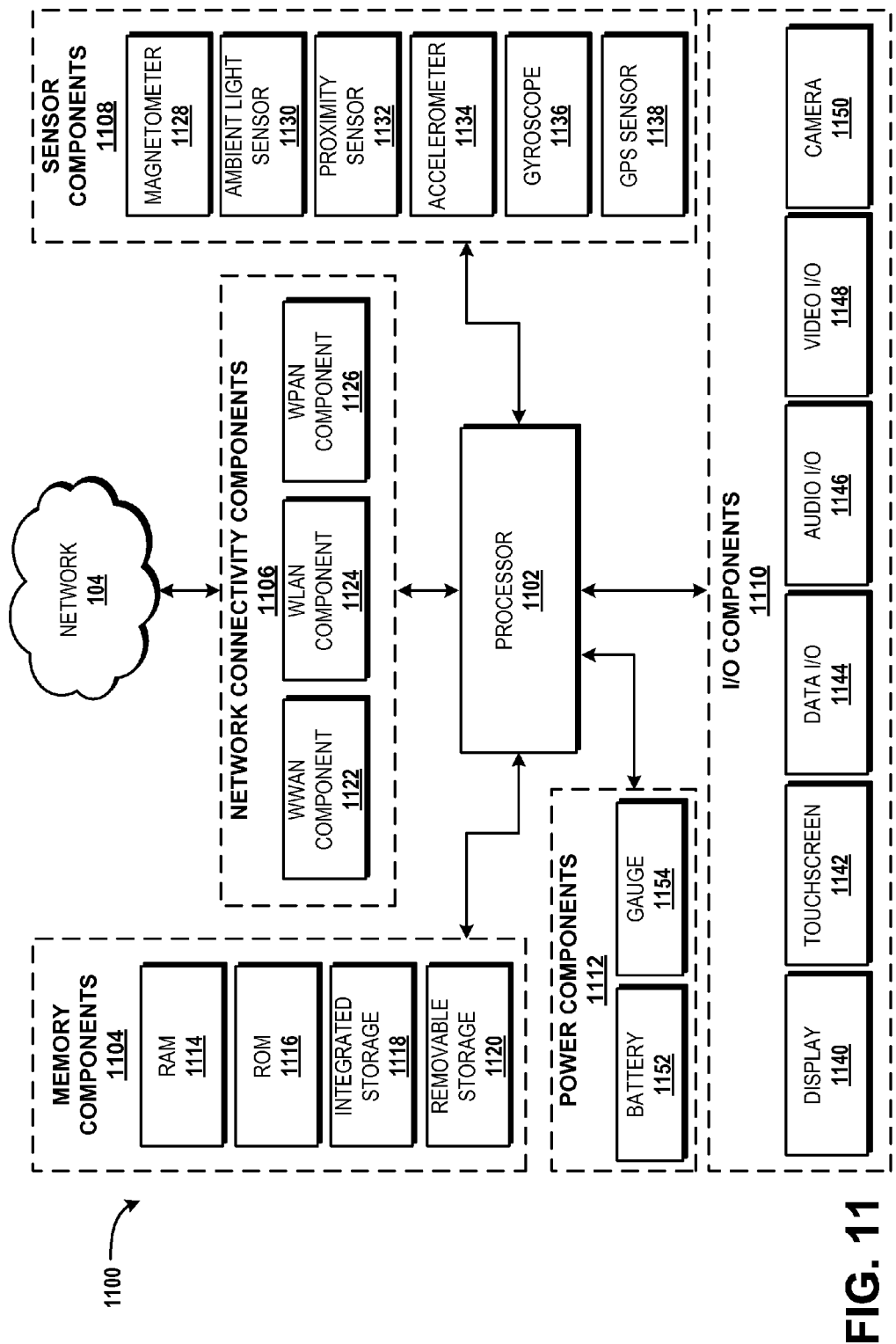
FIG. 11 is a computer architecture diagram illustrating a computing device architecture capable of implementing aspects of the embodiments presented herein.

Turning now to FIG. 11, an illustrative computing device architecture 1100 for a computing device that is capable of executing various software components described herein for providing a 3D annotation facing tool. The computing device architecture 1100 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 1100 is applicable to any of the clients 1006 shown in FIG. 10. Furthermore, aspects of the computing device architecture 1100 can be applicable to traditional desktop computers, portable computers (e.g., laptops, notebooks, ultra-portables, and netbooks), server computers, and other computer systems, such as described herein with reference to FIG. 1. For example, the single touch and multi-touch aspects disclosed herein below can be applied to desktop computers that utilize a touchscreen or some other touch-enabled device, such as a touch-enabled track pad or touch-enabled mouse.

The computing device architecture 1100 illustrated in FIG. 11 includes a processor 1102, memory components 1104, network connectivity components 1106, sensor components 1108, input/output components 1110, and power components 1112. In the illustrated embodiment, the processor 1102 is in communication with the memory components 1104, the network connectivity components 1106, the sensor components 1108, the input/output components 1110, and the power components 1112. Although no connections are shown between the individuals components illustrated in FIG. 11, the components can interact to carry out device functions. In some embodiments, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 can be utilized to execute aspects of the software components presented herein and, particularly, those that utilize, at least in part, a touch-enabled input.

In some embodiments, the processor 1102 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 1102 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some embodiments, the processor 1102 is, or is included in, a system-on-chip ("SoC") along with one or more of the other components described herein below. For example, the SoC can include the processor 1102, a GPU, one or more of the network connectivity components 1106, and one or more of the sensor components 1108. In some embodiments, the processor 1102 is fabricated, in part, utilizing a package-on-package ("PoP") integrated circuit packaging technique. Moreover, the processor 1102 can be a single core or multi-core processor.

The processor 1102 can be created in accordance with an ARM architecture, available for license from ARM HOLDINGS of Cambridge, United Kingdom. Alternatively, the processor 1102 can be created in accordance with an x86 architecture, such as is available from INTEL CORPORATION of Mountain View, Calif. and others. In some embodiments, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random access memory ("RAM") 1114, a read-only memory ("ROM") 1116, an integrated storage memory ("integrated storage") 1118, and a removable storage memory ("removable storage") 1120. In some embodiments, the RAM 1114 or a portion thereof, the ROM 1116 or a portion thereof, and/or some combination the RAM 1114 and the ROM 1116 is integrated in the processor 1102. In some embodiments, the ROM 1116 is configured to store a firmware, an operating system or a portion thereof (e.g., operating system kernel), and/or a bootloader to load an operating system kernel from the integrated storage 1118 or the removable storage 1120.

The integrated storage 1118 can include a solid-state memory, a hard disk, or a combination of solid-state memory and a hard disk. The integrated storage 1118 can be soldered or otherwise connected to a logic board upon which the processor 1102 and other components described herein also can be connected. As such, the integrated storage 1118 is integrated in the computing device. The integrated storage 1118 is configured to store an operating system or portions thereof, application programs, data, and other software components described herein.

The removable storage 1120 can include a solid-state memory, a hard disk, or a combination of solid-state memory and a hard disk. In some embodiments, the removable storage 1120 is provided in lieu of the integrated storage 1118. In other embodiments, the removable storage 1120 is provided as additional optional storage. In some embodiments, the removable storage 1120 is logically combined with the integrated storage 1118 such that the total available storage is made available and shown to a user as a total combined capacity of the integrated storage 1118 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from a network 104, which can be a WWAN, a WLAN, or a WPAN. Although a single network 104 is illustrated, the network connectivity components 1106 can facilitate simultaneous communication with multiple networks. For example, the network connectivity components 1106 can facilitate simultaneous communications with multiple networks via one or more of a WWAN, a WLAN, or a WPAN.

The network 104 can be a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 can utilize various channel access methods (which can or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 can be configured to provide voice and/or data communications with any combination of the above technologies. The network 104 can be configured to or adapted to provide voice and/or data communications in accordance with future generation technologies.

In some embodiments, the WWAN component 1122 is configured to provide dual-multi-mode connectivity to the network 104. For example, the WWAN component 1122 can be configured to provide connectivity to the network 104, wherein the network 104 provides service via GSM and UMTS technologies, or via some other combination of technologies. Alternatively, multiple WWAN components 1122 can be utilized to perform such functionality, and/or provide additional functionality to support other non-compatible technologies (i.e., incapable of being supported by a single WWAN component). The WWAN component 1122 can facilitate similar connectivity to multiple networks (e.g., a UMTS network and an LTE network).

The network 104 can be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 1124 is configured to connect to the network 104 via the WI-FI access points. Such connections can be secured via various encryption technologies including, but not limited, WI-FI Protected Access ("WPA"), WPA2, Wired Equivalent Privacy ("WEP"), and the like.

The network 104 can be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 1126 is configured to facilitate communications with other devices, such as peripherals, computers, or other computing devices via the WPAN.

The sensor components 1108 include a magnetometer 1128, an ambient light sensor 1130, a proximity sensor 1132, an accelerometer 1134, a gyroscope 1136, and a Global Positioning System sensor ("GPS sensor") 1138. It is contemplated that other sensors, such as, but not limited to, temperature sensors or shock detection sensors, also can be incorporated in the computing device architecture 1100.

The magnetometer 1128 is configured to measure the strength and direction of a magnetic field. In some embodiments the magnetometer 1128 provides measurements to a compass application program stored within one of the memory components 1104 in order to provide a user with accurate directions in a frame of reference including the cardinal directions, north, south, east, and west. Similar measurements can be provided to a navigation application program that includes a compass component. Other uses of measurements obtained by the magnetometer 1128 are contemplated.

The ambient light sensor 1130 is configured to measure ambient light. In some embodiments, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some embodiments, the proximity sensor 1132 detects the presence of a user's body (e.g., the user's face) and provides this information to an application program stored within one of the memory components 1104 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1132 are contemplated.

The accelerometer 1134 is configured to measure proper acceleration. In some embodiments, output from the accelerometer 1134 is used by an application program as an input mechanism to control some functionality of the application program. For example, the application program can be a video game in which a character, a portion thereof, or an object is moved or otherwise manipulated in response to input received via the accelerometer 1134. In some embodiments, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some embodiments, output from the gyroscope 1136 is used by an application program as an input mechanism to control some functionality of the application program. For example, the gyroscope 1136 can be used for accurate recognition of movement within a 3D environment of a video game application or some other application. In some embodiments, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 can be used by any application program that requires or benefits from location information. For example, the location calculated by the GPS sensor 1138 can be used with a navigation application program to provide directions from the location to a destination or directions from the destination to the location. Moreover, the GPS sensor 1138 can be used to provide location information to an external location-based service, such as E911 service. The GPS sensor 1138 can obtain location information generated via WI-FI, WIMAX, and/or cellular triangulation techniques utilizing one or more of the network connectivity components 1106 to aid the GPS sensor 1138 in obtaining a location fix. The GPS sensor 1138 can also be used in Assisted GPS ("A-GPS") systems.

The I/O components 1110 include a display 1140, a touchscreen 1142, a data I/O interface component ("data I/O component") 1144, an audio I/O interface component ("audio I/O component") 1146, a video I/O interface component ("video I/O component") 1148, and a camera 1150. In some embodiments, the display 1140 and the touchscreen 1142 are combined. In some embodiments two or more of the data I/O component 1144, the audio I/O component 1146, and the video I/O component 1148 are combined. The I/O components 1110 can include discrete processors configured to support the various interface described below, or can include processing functionality built-in to the processor 1102.

The display 1140 is an output device configured to present information in a visual form. In particular, the display 1140 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 1140 is a liquid crystal display ("LCD") utilizing any active or passive matrix technology and any backlighting technology (if used). In some embodiments, the display 1140 is an organic light emitting diode ("OLED") display. Other display types are contemplated.

The touchscreen 1142 is an input device configured to detect the presence and location of a touch. The touchscreen 1142 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some embodiments, the touchscreen 1142 is incorporated on top of the display 1140 as a transparent layer to enable a user to use one or more touches to interact with objects or other information presented on the display 1140. In other embodiments, the touchscreen 1142 is a touch pad incorporated on a surface of the computing device that does not include the display 1140. For example, the computing device can have a touchscreen incorporated on top of the display 1140 and a touch pad on a surface opposite the display 1140.

In some embodiments, the touchscreen 1142 is a single-touch touchscreen. In other embodiments, the touchscreen 1142 is a multi-touch touchscreen. In some embodiments, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1142. As such, a developer can create gestures that are specific to a particular application program.

In some embodiments, the touchscreen 1142 supports a tap gesture in which a user taps the touchscreen 1142 once on an item presented on the display 1140. The tap gesture can be used for various reasons including, but not limited to, opening or launching whatever the user taps. In some embodiments, the touchscreen 1142 supports a double tap gesture in which a user taps the touchscreen 1142 twice on an item presented on the display 1140. The double tap gesture can be used for various reasons including, but not limited to, zooming in or zooming out in stages. In some embodiments, the touchscreen 1142 supports a tap and hold gesture in which a user taps the touchscreen 1142 and maintains contact for at least a pre-defined time. The tap and hold gesture can be used for various reasons including, but not limited to, opening a context-specific menu.

In some embodiments, the touchscreen 1142 supports a pan gesture in which a user places a finger on the touchscreen 1142 and maintains contact with the touchscreen 1142 while moving the finger on the touchscreen 1142. The pan gesture can be used for various reasons including, but not limited to, moving through screens, images, or menus at a controlled rate. Multiple finger pan gestures are also contemplated. In some embodiments, the touchscreen 1142 supports a flick gesture in which a user swipes a finger in the direction the user wants the screen to move. The flick gesture can be used for various reasons including, but not limited to, scrolling horizontally or vertically through menus or pages. In some embodiments, the touchscreen 1142 supports a pinch and stretch gesture in which a user makes a pinching motion with two fingers (e.g., thumb and forefinger) on the touchscreen 1142 or moves the two fingers apart. The pinch and stretch gesture can be used for various reasons including, but not limited to, zooming gradually in or out of a website, map, or picture.

Although the above gestures have been described with reference to the use one or more fingers for performing the gestures, other appendages such as toes or objects such as styluses can be used to interact with the touchscreen 1142. As such, the above gestures should be understood as being illustrative and should not be construed as being limiting in any way.

Figure 12:
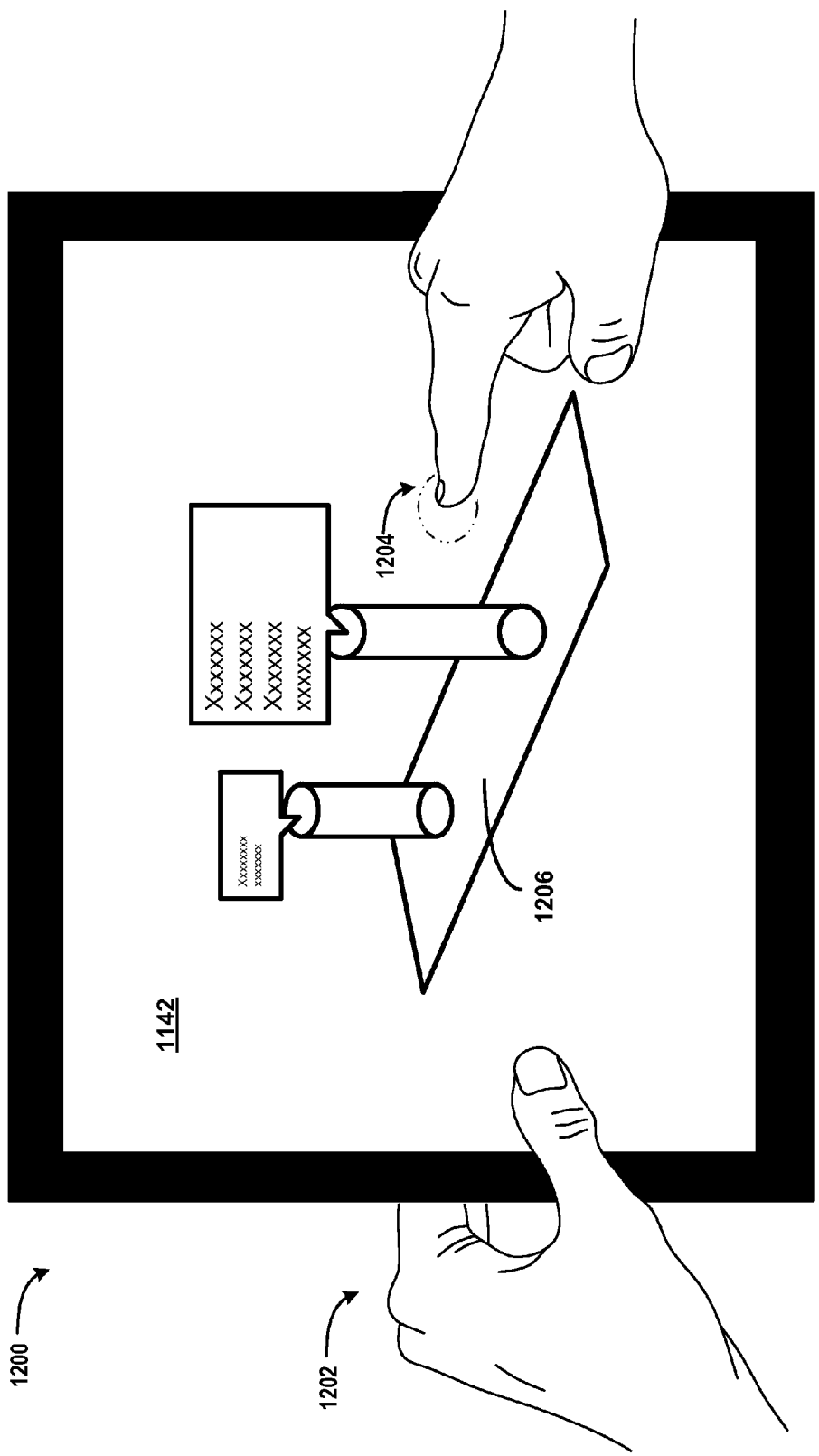
FIG. 12 is an illustration showing the implementation of various aspects of the embodiments presented herein on a tablet device.

FIG. 12 is an illustration of a touchscreen 1142 for a table device 1200 that can be used in conjunction with one or more features of the concepts and technologies disclosed herein. Tablet device 1200 can have touchscreen 1142 that provides input as described above with reference to FIG. 11. A user 1202 can use tablet device 1200 for annotating data and modifying the 3D environment in which the annotated data is rendered in accordance with various embodiments disclosed herein. In one exemplary embodiment, user 1202 can use a stylus pen, his or her finger, toe, or other body at touch point 1204 to change the orientation of 3D space 1206. It should be noted that touch point 1204 is merely exemplary, as tablet device 1200 can have functionality to allow user 1202 to touch various locations of touchscreen 1142 and perform various tasks. It should be noted that the tablet device 1200 of FIG. 12 is illustrative only, the present disclosure of which is not limited to any particular configuration.

Returning now to FIG. 11, the data I/O interface component 1144 is configured to facilitate input of data to the computing device and output of data from the computing device. In some embodiments, the data I/O interface component 1144 includes a connector configured to provide wired connectivity between the computing device and a computer system, for example, for synchronization operation purposes. The connector can be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 1146 is configured to provide audio input and/or output capabilities to the computing device. In some embodiments, the audio I/O interface component 1144 includes a microphone configured to collect audio signals. In some embodiments, the audio I/O interface component 1144 includes a headphone jack configured to provide connectivity for headphones or other external speakers. In some embodiments, the audio I/O component 1146 includes a speaker for the output of audio signals. In some embodiments, the audio I/O interface component 1144 includes an optical audio cable out.

The video I/O interface component 1148 is configured to provide video input and/or output capabilities to the computing device. In some embodiments, the video I/O interface component 1148 includes a video connector configured to receive video as input from another device (e.g., a video media player such as a DVD or BLURAY player) or send video as output to another device (e.g., a monitor, a television, or some other external display). In some embodiments, the video I/O interface component 1148 includes a High-Definition Multimedia Interface ("HDMI"), mini-HDMI, micro-HDMI, DisplayPort, or proprietary connector to input/output video content. In some embodiments, the video I/O interface component 1148 or portions thereof is combined with the audio I/O interface component 1146 or portions thereof.

The camera 1150 can be configured to capture still images and/or video. The camera 1150 can utilize a charge coupled device ("CCD") or a complementary metal oxide semiconductor ("CMOS") image sensor to capture images. In some embodiments, the camera 1150 includes a flash to aid in taking pictures in low-light environments. Settings for the camera 1150 can be implemented as hardware or software buttons.

Although not illustrated, one or more hardware buttons can also be included in the computing device architecture 1100. The hardware buttons can be used for controlling some operational aspect of the computing device. The hardware buttons can be dedicated buttons or multi-use buttons. The hardware buttons can be mechanical or sensor-based.

The illustrated power components 1112 include one or more batteries 1152, which can be connected to a battery gauge 1154. The batteries 1152 can be rechargeable or disposable. Rechargeable battery types include, but are not limited to, lithium polymer, lithium ion, nickel cadmium, and nickel metal hydride. Each of the batteries 1152 can be made of one or more cells.

The battery gauge 1154 can be configured to measure battery parameters such as current, voltage, and temperature. In some embodiments, the battery gauge 1154 is configured to measure the effect of a battery's discharge rate, temperature, age and other factors to predict remaining life within a certain percentage of error. In some embodiments, the battery gauge 1154 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1112 can also include a power connector, which can be combined with one or more of the aforementioned I/O components 1110. The power components 1112 can interface with an external power system or charging equipment via a power component 1112.

Based on the foregoing, it should be appreciated that concepts and technologies for providing a 3D annotation facing tool have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:
1. A computer, comprising:
 a processor; and
 a computer-readable storage medium in communication with the processor, the computer-readable storage medium having computer-executable instructions stored thereupon which, when executed by the processor, cause the processor to:
 render a graphical representation of data in a three-dimensional (3D) environment;
 render at least one annotation in the 3D environment, wherein the at least one annotation is associated with the data, and wherein the annotation includes a graphical representation that is visible in a first orientation along a first directional axis of three directional axes in the 3D environment and visible in a second orientation along a second directional axis of the three directional axes in the 3D environment;
 receive an input to change an orientation of the graphical representation of the data rendered in the 3D environment;
 in response to the input to change the orientation of the graphical representation of the data, determine that the changed orientation of the graphical representation causes the at least one annotation to render illegible content within the at least one annotation;

in response to a determination that the at least one annotation maintains legibility of the content within the at least one annotation by a change to the first orientation and the second orientation of the at least one annotation, change the first orientation and the second orientation of the at least one annotation in the 3D environment based on the input to change the orientation of the graphical representation; and in response to a determination that the at least one annotation maintains legibility of the content within the at least one annotation by use of a special annotation orientation, apply the special annotation orientation to the at least one annotation by changing the first or the second orientation while increasing or decreasing an amount of information rendered in the at least one annotation, wherein the amount of information rendered in the at least one annotation is increased based on a size of the at least one annotation if the input to change the orientation of the graphical representation is a request to zoom in on the data and the amount of information rendered in the at least one annotation that is rendered is decreased based on a size of the at least one annotation if the input to change the orientation of the graphical representation is a request to zoom out from the data.

2. The computer of claim 1, wherein the input to change the first orientation comprises an input to zoom in, zoom out, pan or tilt.

3. The computer of claim 1, wherein the special annotation orientation comprises a camera facing view, wherein the second orientation is maintained constant relative to the input to change the first orientation.

4. The computer of claim 1, wherein the special annotation orientation comprises locking the second orientation along one axis of rotation and permitting an unlocked second axis of rotation to change.

5. The computer of claim 4, wherein locking the second orientation along the one axis of rotation comprises maintaining the one axis of rotation of the second orientation constant relative to the input to change the first orientation and, permitting the second axis of rotation to change comprises changing the second axis of rotation relative to the input to change the first orientation.

6. The computer of claim 1, further comprising computer-executable instructions that cause the processor to change at least one aspect of the data based on the input to change the first orientation.

7. The computer of claim 6, wherein the at least one aspect of the data comprises changing a height of the data or an orientation of the data.

8. A method for providing a user interface to search for and obtain content, the method comprising:

rendering a graphical representation of data in a three-dimensional (3D) environment;

render at least one annotation in the 3D environment, wherein the at least one annotation is associated with the data, and wherein the data includes a graphical representation that is visible in a first orientation along a first directional axis of three directional axes in the 3D environment and visible in a second orientation along a second directional axis of the three directional axes in the 3D environment;

receiving an input to change the graphical representation of the data rendered in the 3D environment, wherein the change is to zoom in on the graphical representation of the data rendered in the 3D environment in the first orientation, to zoom out on the data, to pan the first orientation, or to tilt the first orientation;

in response to the input to change the graphical representation of the data, determining that the change to the graphical representation causes the at least one annotation to render illegible content within the at least one annotation;

in response to a determination that the at least one annotation maintains legibility of the content within the at least one annotation by a change to the first orientation and the second orientation of the at least one annotation, changing the first orientation and the second orientation of the at least one annotation in the 3D environment based on the input;

in response to a determination that the at least one annotation maintains legibility of the content within the at least one annotation by use of a special annotation orientation, applying the special annotation orientation to the at least one annotation by changing the first or the second orientation while increasing or decreasing an amount of information rendered in the at least one annotation, wherein the amount of information rendered in the at least one annotation is increased based on a size of the at least one annotation if the input is a request to zoom in on the data and the amount of information rendered in the at least one annotation that is rendered is decreased if the input is a request to zoom out on the data.

9. The method of claim 8, wherein the special annotation orientation comprises a camera facing view, wherein the second orientation is maintained constant relative to the input to change the first orientation.

10. The method of claim 8, wherein the special annotation orientation comprises locking the second orientation along at least one axis of rotation and permitting an unlocked second axis of rotation to change.

11. The method of claim 10, wherein locking the second orientation along at least one axis of rotation comprises maintaining the at least one axis of rotation of the second orientation constant relative to the input.

12. A computer-readable storage medium in communication with a processor, the computer-readable storage medium having computer-executable instructions stored thereupon which, when executed by the processor, cause the processor to render a graphical representation of data in a three-dimensional (3D) environment;

render at least one annotation in the 3D environment, wherein the at least one annotation is associated with the data, and wherein the data includes a graphical representation that is visible in a first orientation along a first directional axis of three directional axes in the 3D environment and a second orientation along a second directional axis of the three directional axes in the 3D environment, receive an input to change an orientation of the graphical representation of the data rendered in the 3D environment;

in response to the input to change the orientation of the graphical representation of the data, determine that the changed orientation of the graphical representation causes the at least one annotation to render illegible content within the at least one annotation;

in response to a determination that the at least one annotation maintains legibility of the content within the at least one annotation by changing the first orientation and the second orientation of the at least one annotation, change the first orientation and the second orientation of the at least one annotation in the 3D environment based on the input to change the orientation of the graphical representation; and in response to a determination that the at least one annotation maintains legibility of the content within the at least one annotation by use of a special annotation orientation, apply the special annotation orientation to the at least one annotation by changing the first or the second orientation while increasing or decreasing an amount of information rendered in the at least one annotation, wherein the amount of information rendered in the at least one annotation is increased based on a size of the at least one annotation if the input to change the orientation of the graphical representation is a request to zoom in on the data and the amount of information rendered in the at least one annotation that is rendered is decreased based on a size of the at least one annotation if the input to change the orientation of the graphical representation is a request to zoom out on the data.

13. The computer-readable storage medium of claim 12, wherein the input to change the first orientation comprises an input to zoom in, zoom out, pan or tilt.

14. The computer-readable storage medium of claim 12, wherein the data comprises geocoding data to render the data and annotations in a map.

15. The computer-readable storage medium of claim 12, further comprising computer-executable instructions that cause the processor to change at least one aspect of the data based on the input to change the first orientation.

16. The computer-readable storage medium of claim 15, wherein the at least one aspect of the data comprises changing a height of the data or an orientation of the data.

\* \* \* \* \*